(12) United States Patent
Sasaki et al.

(10) Patent No.: US 6,486,992 B1
(45) Date of Patent: Nov. 26, 2002

(54) MODULATING AND DEMODULATING METHOD AND TRANSMITTING METHOD OF CONTROL APPARATUS AND CONTROL APPARATUS

(75) Inventors: Takatsuna Sasaki, Tokyo (JP); Norihito Mihota, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/174,843

(22) Filed: Oct. 19, 1998

(30) Foreign Application Priority Data

Oct. 21, 1997 (JP) .............................................. 9-288791
Dec. 25, 1997 (JP) .............................................. 9-358267

(51) Int. Cl.$^7$ .............................................. H04B 10/00
(52) U.S. Cl. ...................................... 359/161; 359/184
(58) Field of Search ................................ 375/280, 281; 359/172, 181, 159, 161, 154, 140, 184

(56) References Cited

U.S. PATENT DOCUMENTS

| 5,528,391 A | * | 6/1996 | Elrod ............................. 349/1 |
| 5,877,880 A | * | 3/1999 | Kuo ............................. 359/159 |
| 5,917,634 A | * | 6/1999 | Otobe ......................... 359/172 |
| 5,943,151 A | * | 8/1999 | Grasso et al. ............... 359/161 |

* cited by examiner

Primary Examiner—Jason Chan
Assistant Examiner—Christina Y Leung
(74) Attorney, Agent, or Firm—Frommer Lawrence & Haug LLP

(57) ABSTRACT

A wireless communication network has a plurality of child nodes and a control node. Communication is carried out by using infrared or the like. The child nodes have modulators and demodulators. The modulators include modulation sets comprising the same kind of a modulation system having different multiple value formation levels. The modulation system is selected from the modulation sets in accordance with the communication distance or the communication speed necessary for the child node. Data is transmitted at high speed by precisely and simply restricting multiple paths. A delay amount of multiple paths whereby the S/N ratio remains equal both where multiple paths are present and where they are not present, is calculated; and a reflection position constituting the delay amount also is calculated. When an optical signal is reflected from outside of the reflection position, the delay amount is increased and the S/N ratio is deteriorated more than in the case where the multiple paths are not present and accordingly, the radiation angle of a light emitting unit and the light receiving angle of a light receiving unit are set such that the signal reflected from outside of the reflection position can be restricted.

15 Claims, 26 Drawing Sheets

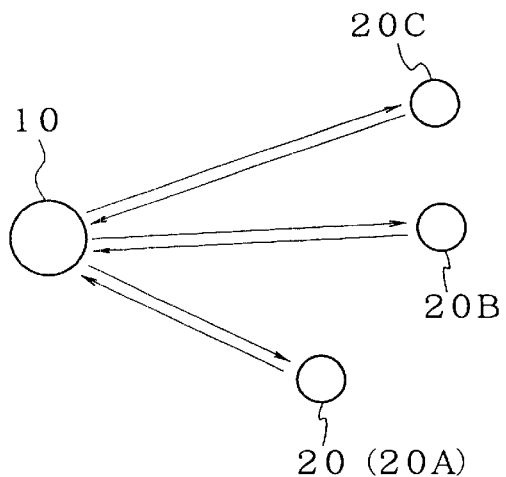
F I G. 1
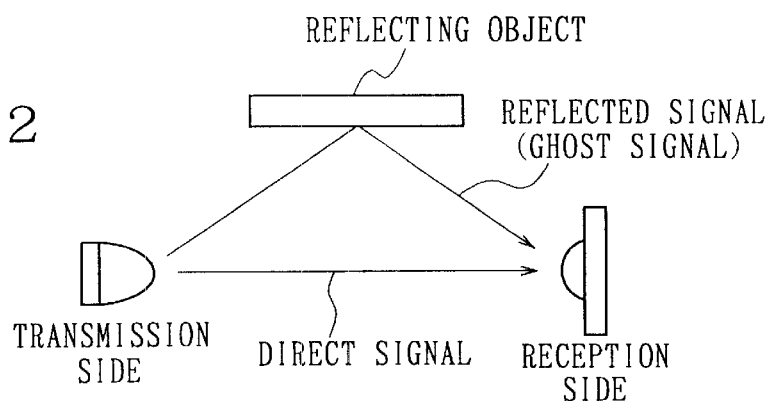
F I G. 2
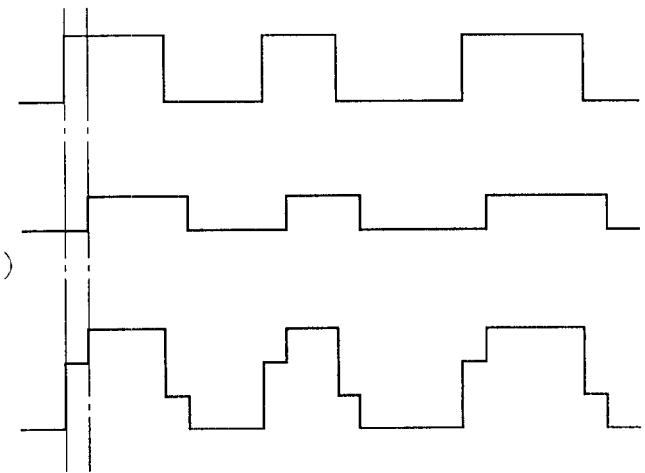
F I G. 3A  DIRECT SIGNAL
F I G. 3B  REFLECTED SIGNAL (GHOST SIGNAL)
F I G. 3C  RECEPTION SIGNAL

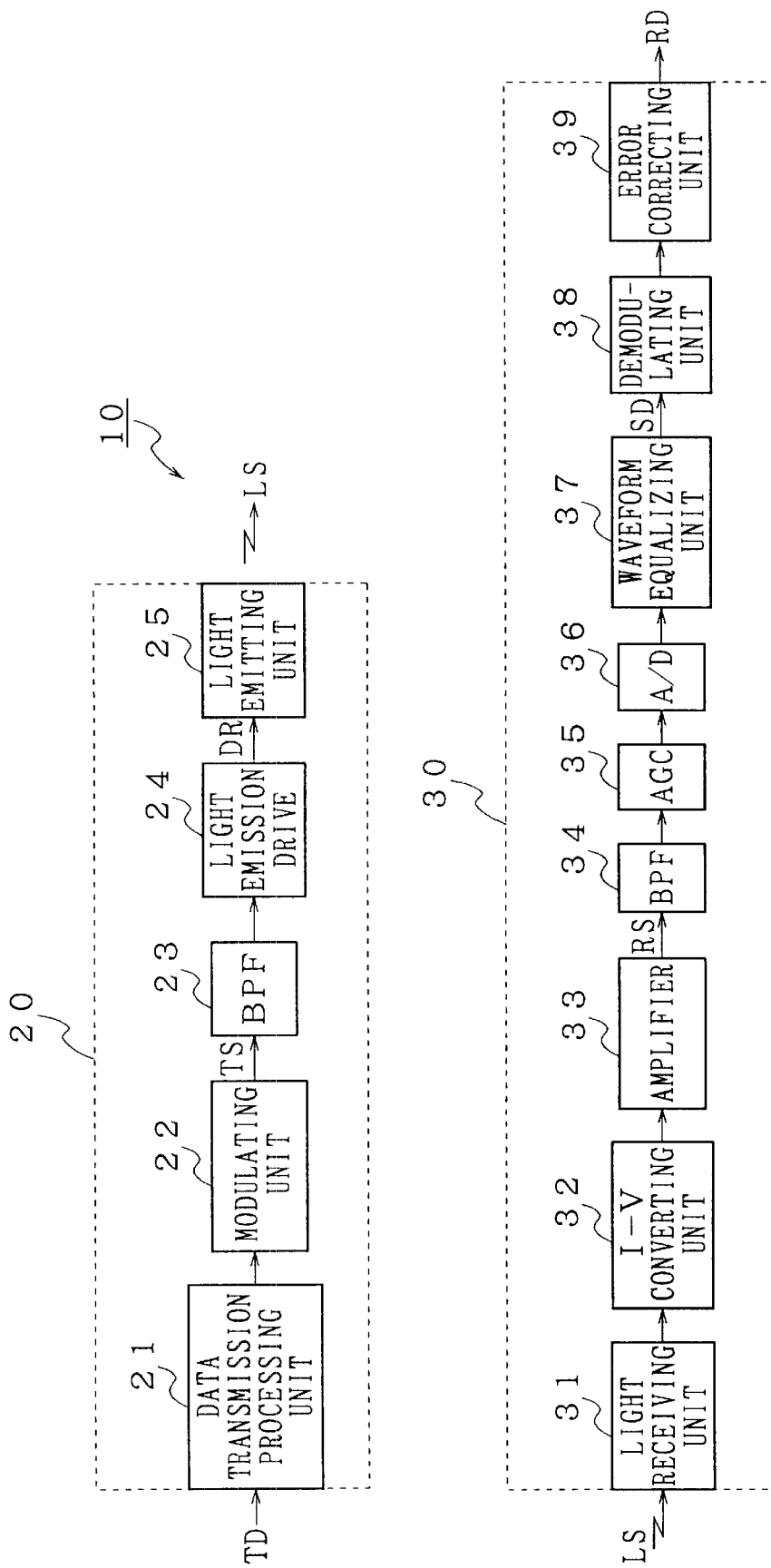

FIG. 9A
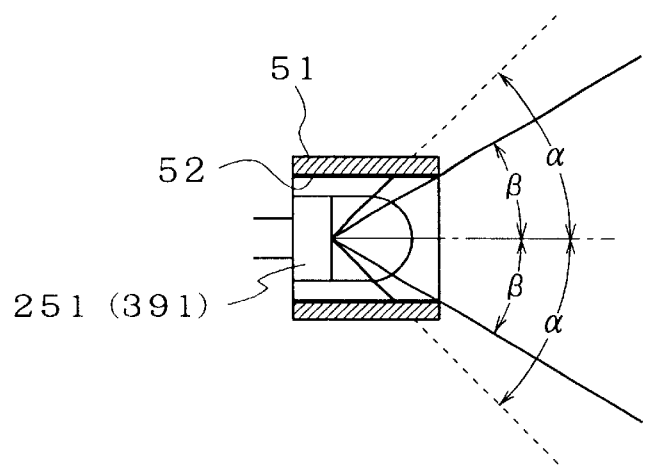
FIG. 9B
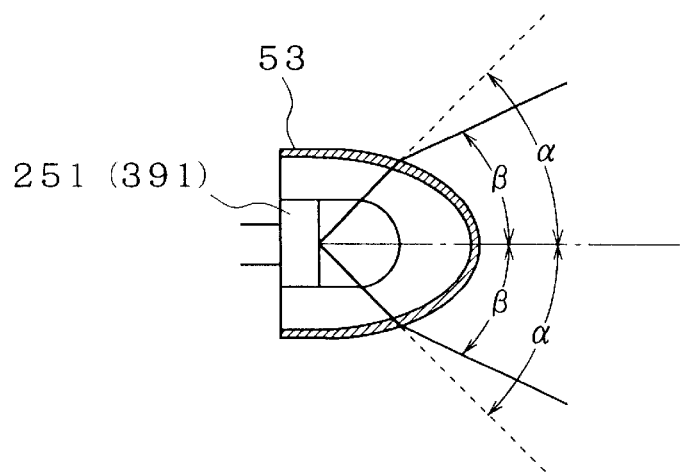
FIG. 11A
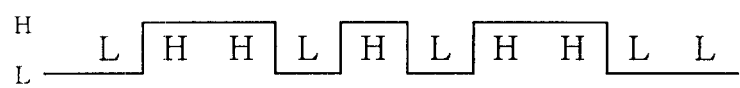
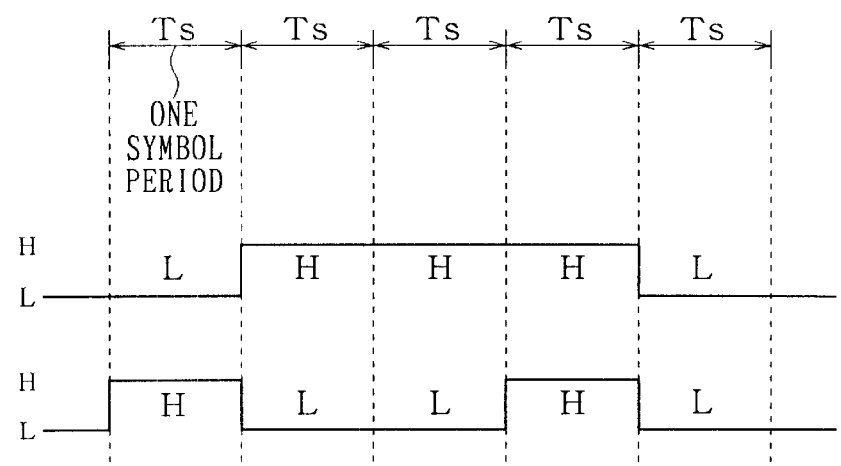
FIG. 11B
FIG. 11C
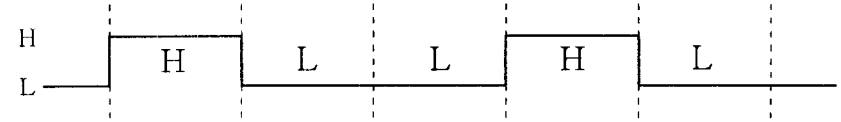

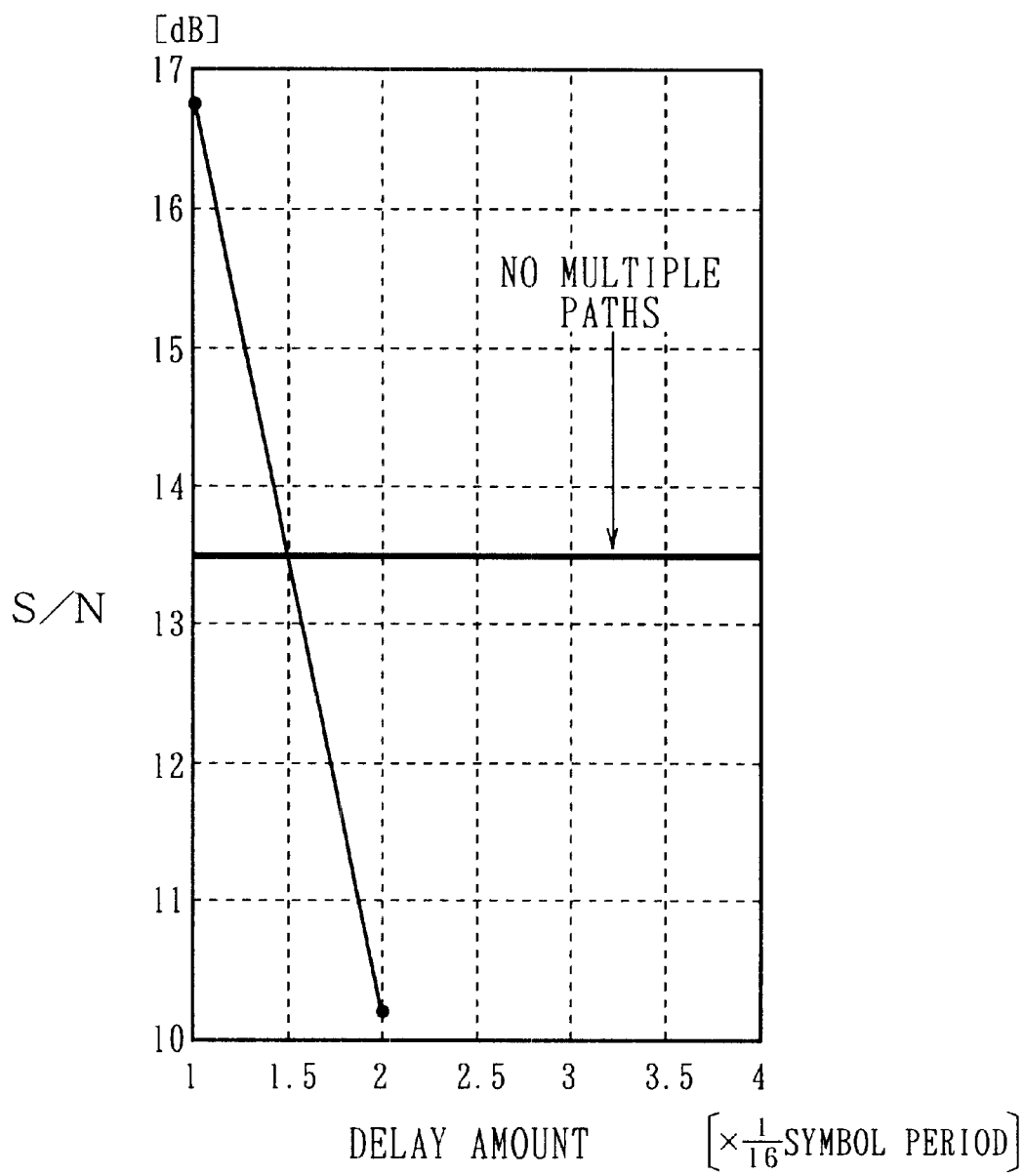

F I G. 2 6
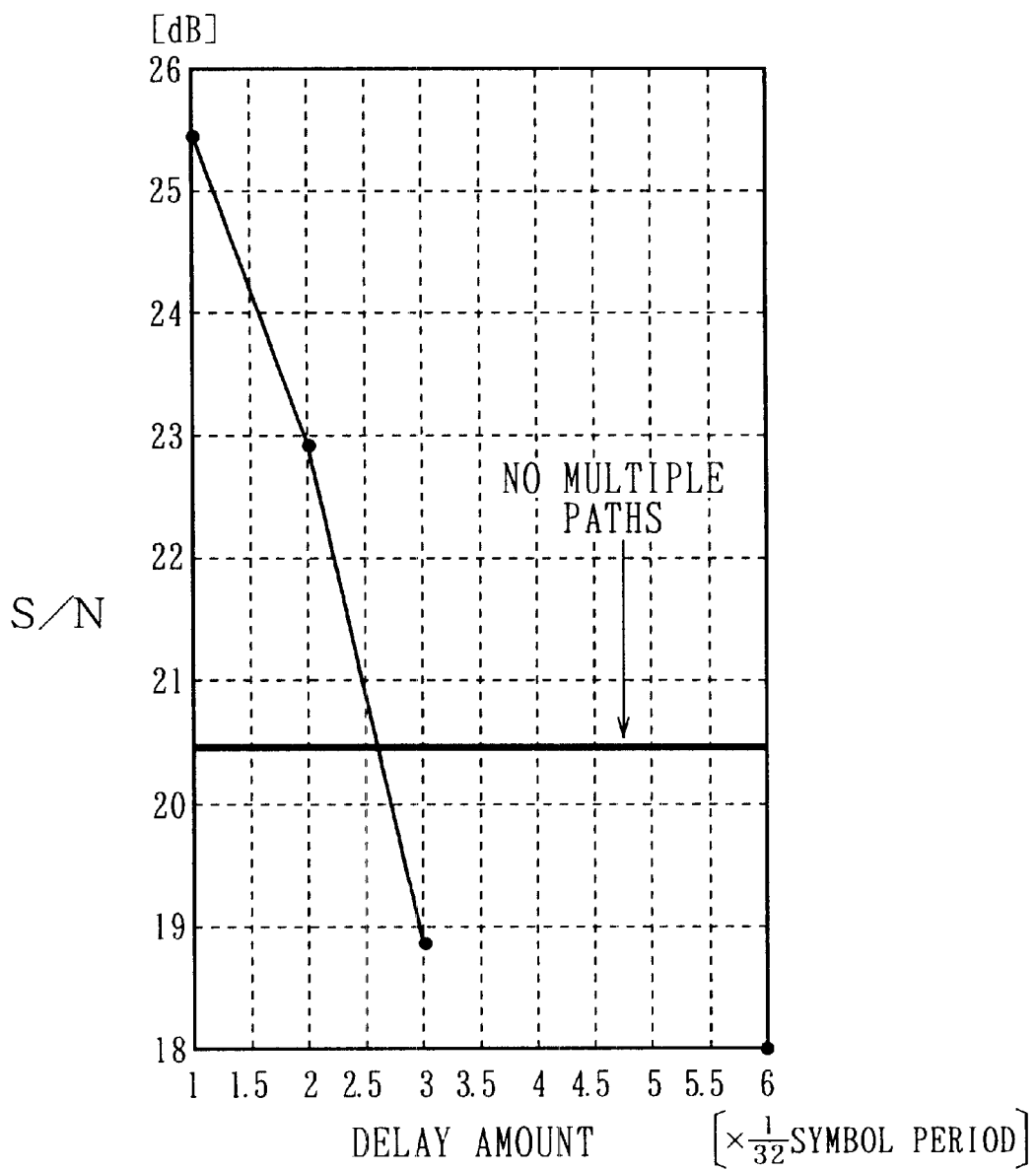

MODULATING AND DEMODULATING METHOD AND TRANSMITTING METHOD OF CONTROL APPARATUS AND CONTROL APPARATUS

BACKGROUND OF THE INVENTION

1. Field of the Invention

The present invention relates to a modulating and demodulating method and a transmitting method of a control apparatus and a control apparatus using thereof which is preferably applied to a case in which a wireless communication network or the like is constructed by utilizing infrared ray or the like. In details, when communication is carried out between an apparatus on the controlling side (control node) and an apparatus on the controlled side (controlled node) which function as terminals of wireless communication, modulation sets adopting the same kind of a modulation system having different multiple value formation levels are prepared and an optimum modulation system is selected in accordance with communication distance or communication speed flexibility in respect of participation in a wireless communication network can be provided under more pertinent circuit scale.

Further, when optical transmission is carried out as a wireless communication, in obtaining reception data by receiving an optical signal outputted from a transmitter, the optical signal which is delayed is restricted such that a bit error rate thereof is not deteriorated more than a predetermined bit error rate by which adverse influence of the delayed optical signal is avoided and transmission of data can be carried out at high speed and excellently.

2. Description of the Related Art

In recent years, with progress of spread of portable devices, wireless formation of various analog and digital interfaces is promoted. Particularly, in the field of computer, wireless formation and high speed communication are intensively carried out, for example, by using technologies represented by wireless LAN (local area network) and IrDA (infrared data association), construction of a network (wireless network) by noncontact connection has been progressed not only between portable devices (communication devices or the like) disposed in the same room but also between a portable device and an installed device (television receiver or the like).

According to the wireless network, there is constructed a network in which one device constitutes a parent node (control node) and remaining one or more of devices constitute child nodes (controlled nodes) and communication between the parent node and the child nodes is connected by optical communication utilizing infrared ray or the like.

FIG. 1 shows a case in which a wireless communication network is constructed by one parent node 10 and one or more, three in this example of child nodes 20 (20A, 20B and 20C). Means (transmitting means and receiving means) for carrying out optical communication by infrared ray are installed at insides of the respective nodes 10 and 20. The child node 20 can communicate with only the parent node 10 by carrying out communication in synchronism with each other by using infrared ray.

When such a network for wireless communication is constructed, as a modulation system used in communication between the respective child nodes 20 and the parent node 10, the following cases are conceivable.

(1) The same modulation system is adopted for the parent node 10 and the child nodes 20.

(2) The respective nodes adopt different modulation systems.

Meanwhile, the following problems are conceivable in the above-described wireless communication means. That is, when the system (1) mentioned above is adopted as a communication system in carrying out data communication in order to simplify communication control and reduce the circuit scale as less as possible, the communication control is simplified since the same modulation system is adopted in the respective communication, however, transmission speed and communication distance between the nodes are fixed by the adopted modulation system and accordingly, a communication system which is devoid of flexibility is constituted.

Therefore, in order to carry out higher speed communication, the problem cannot be dealt with unless the modulation system is changed and when lower speed communication is sufficient, a wasteful equipment is provided. Because the circuit scale cannot be reduced.

Further, according to the system (2), when different modulation systems are adopted in communication between respective nodes such as between the parent node 10 and the child node 20A or the parent node 10 and the child node 20B, in the respective child nodes 20A, 20B and 20C, synchronizing circuits in correspondence with the modulation systems used by the respective child nodes become necessary and further, the communication control is also complicated.

Further, when transmission of data is carried out by using an optical signal of infrared ray or the like, on the reception side, as shown by FIG. 2, a direct signal from the transmission side and an optical signal which is delayed by being reflected by a reflecting object are supplied. Therefore, multiple paths are caused by a direct signal shown by FIG. 3A and a reflected signal (ghost signal) shown by FIG. 3B in which the signal level of the direct signal is attenuated and the signal is delayed and a reception signal shown by FIG. 3C is outputted from the reception side.

In this way, the signal waveform of the reception signal is changed by reflection of the signal and accordingly, S/N ratio (signal to noise ratio) is deteriorated, when the data transmission speed becomes fast, influence of the change in the signal waveform is significant and data cannot be transmitted correctly.

Therefore, in order to remove such an adverse influence by the multiple paths, for example, there is carried out a processing in which in starting data transmission, predetermined data is transmitted and received, influence of multiple paths is confirmed and adverse influence of multiple paths is removed from a reception signal in data transmission thereafter. However, according to a method of using so-to-speak adaptive automatic equalization where data transmission is carried out correctly by removing influence of multiple paths, circuits for removing influence of multiple paths are added and load of signal processing for removing influence of multiple paths is increased.

SUMMARY OF THE INVENTION

Hence, it is an object of the present invention to be able to construct a wireless communication network without excessively enlarging circuit scale and which is rich in flexibility by being able to select a pertinent modulation system in accordance with communication distance and communication speed.

Further, it is an object of the present invention to provide an optical transmission method and an optical transmission apparatus capable of transmitting data at high speed and excellently by precisely and simply restricting multiple paths.

In order to resolve the above-described problems, according to one aspect of the present invention, there is provided a modulating and demodulating method of a control apparatus, wherein in a wireless communication network in which one or more of controlled control apparatuses are present in respect of one control apparatus and mutual communication is carried out between the control apparatus and the controlled control apparatuses by using infrared ray or the like, modulation sets comprising a same kind of a modulation system having different multiple value formation levels are prepared for the controlled control apparatuses, a modulation system is selected from the modulation sets in accordance with communication distance and communication speed necessary for the controlled control apparatuses and a signal is modulated by using the selected modulation system.

According to another aspect of the present invention, there is provided a control apparatus, wherein in a wireless communication network in which one or more of controlled control apparatuses are present in respect of one control apparatus and mutual communication is carried out between the control apparatus and the controlled control apparatuses by using infrared ray or the like, the controlled control apparatuses are respectively installed with modulating means and demodulating means of a signal, the modulating means are prepared with modulation sets comprising a same kind of a modulation system having different multiple value formation levels, a modulation system determined in accordance with communication distances and communication speeds necessary for the controlled control apparatuses is selected from among the modulation sets and the signal is modulated by using the selected modulation system.

According to the present invention, the modulation sets comprising the same kind of the modulation system having different multiple value formation levels are prepared for child nodes which are the control apparatuses on the controlled side. The parent node which is the control apparatus on the controlling side periodically transmits control blocks by using modulation having a lowest multiple value formation level among the modulation sets. The modulation system having the lowest multiple value formation level is utilized in consideration of the fact that a child node capable of carrying out communication only by the communication system having the lowest multiple value formation level participates in the wireless communication network.

By contrast, according to the modulation system used in the child node, the multiple value formation level is selected in accordance with a priority in the communication distance and the communication speed.

For example, when a child node which has a priority in the communication speed over the communication distance communicates with the parent node, the modulation system having a comparatively high multiple value formation level is adopted from among the modulation sets. By contrast, when a child node which has a priority in the communication distance over the communication speed communicates with the parent node, the modulation system having a comparatively low multiple value formation level is adopted from among the modulation sets. Therefore, the parent node is provided with the demodulating means capable of demodulating all of the modulation systems which can be selected by the child nodes.

Further, according to an optical transmission method of the present invention, transmission and reception of the optical signal is carried out while restricting an optical signal having a large delay amount than a delay amount of an optical signal which is delayed when the delayed optical signal is received and the reception data constitutes a predetermined bit error rate.

Further, according to another aspect of the present invention, there is provided an optical transmission apparatus comprising transmitting means for transmitting an optical signal based on transmission data, receiving means for providing reception data by receiving the optical signal outputted from the transmitting means and optical restricting means for restricting the optical signal supplied from the transmitting means to the receiving means by being delayed by more than a predetermined delay amount. Further, the transmitting means includes modulating means for distributing the transmission data and carrying out quadrature modulation by using the distributed transmission data and signal outputting means for transmitting the optical signal based on the transmission signal provided by the modulating means, the receiving means includes demodulating means for forming reception data by demodulating a signal provided by receiving the optical signal and the optical restricting means restricts the optical signal having a delay amount larger than a delay amount of the optical signal which is delayed when the delayed optical signal is received and the reception data constitutes a predetermined bit error rate.

According to the optical transmission method and the optical transmission apparatus, when the optical signal outputted from a transmitter is received and the reception data is provided, the optical signal having a delay amount larger than a delay amount of the delayed optical signal is restricted at the predetermined bit error rate by restricting a radiation angle or a light receiving angle of the optical signal by optical signal restricting means of, for example, a light blocking tube, an optical lens or the like such that the bit error rate is not deteriorated more than the predetermined bit error rate.

BRIEF DESCRIPTION OF THE DRAWINGS

FIG. 1 is a constitution diagram for explaining a communication network according to the present invention;

FIG. 2 is a view indicating data transmission using an optical signal;

FIGS. 3A, 3B and 3C are diagrams showing an influence of multiple paths;

FIG. 8 is a view showing a constitution of an optical transmission apparatus;

FIGS. 9A and 9B are views showing constitutions of optical signal controlling units;

FIGS. 11A, 11B and 11C are diagrams showing symbols;

FIG. 22 is a diagram showing a relationship between a delay amount of a reflection signal and an S/N ratio of reception data;

FIG. 26 is a diagram showing a relationship between a delay amount of a reflection signal and an S/N ratio of reception data;

DETAILED DESCRIPTION OF THE PREFERRED EMBODIMENTS

Figure 4:
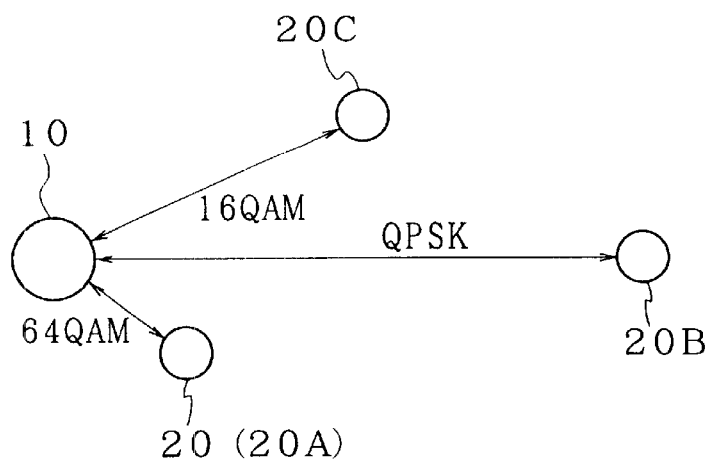
FIG. 4 is a constitution view of a communication network showing an embodiment of the present invention.

A detailed explanation will be given of a modulating and demodulating method of a control apparatus according to the present invention and a case in which one embodiment of the control apparatus in use thereof is applied to a wireless communication network in reference to the drawings. In a network as shown by FIG. 4, the present invention is applied to a network in which optical communication using infrared ray is carried out between a plurality of child nodes 20 and a parent node 10 while synchronizing them.

According to the present invention, modulation sets comprising a same kind of a modulation system having different multiple value formation levels are prepared for the child nodes 20 which are control apparatuses on the controlled side. For example, modulation sets adopting a same kind of modulation system and respectively having different multiple value formation levels, or four kinds in this example of QPSK (quadrature phase shift keying), 16 QAM (16 quadrature amplitude modulation), 64 QAM and 256 QAM as an amplitude modulation system. Further, the respective child nodes 20 are prepared with several kinds of modulation sets among these in accordance with communication distance and communication speed.

A modulation system having a low multiple value formation level is basically strong at error tolerance and a modulation system having a high multiple value formation level is weak at the error tolerance. Accordingly, for example, when the child node 20 which has a priority in the communication speed over the communication distance communicates with the parent node 10, a modulation system having a high multiple value formation level is adopted from among the modulation sets. In contrast thereto, when the child node 20 which has a priority in the communication distance over the communication speed communicates with the parent node 10, a modulation system having a low multiple value formation level is adopted from among the modulation sets.

Accordingly, the child node 20A which is disposed at a location in which the communication distance is the nearest to the parent node 10, is considered to be a node requiring a faster communication speed although a communicatable distance may not be so long and accordingly, communication is carried out in this example by a communication system belonging to communication systems having high multiple value formation levels, for example, 64 QAM.

Since the child node 20A can carry out communication by 64 QAM, the modulating means of the child node 20A includes modulating means which can carry out transmission by modulating data even by all of modulation systems having multiple value formation levels lower than 64 QAM and therefore, 16 QAM and QPSK.

The child node 20B shown by FIG. 4 is most remote from the parent node 10. According to the child node 20B in this case, the communication distance is considered to be preferably long although the communication speed may be low. Therefore, in this case, a modulation system having a lowest multiple value formation level (QPSK) is selected.

The child node 20C disposed between the child nodes 20A and 20B may have a moderate communication distance and may have a moderate communication speed and therefore, in this example, a modulation system of 16 QAM is selected. Therefore, the child node 20C is installed with modulating means realizing two kinds of modulation systems of QPSK and 16 QAM.

Further, the parent node 10 must be able to carry out communication even when any kinds of modulation are used in the child nodes 20 and accordingly, the parent node 10 is installed with modulating means and demodulating means in correspondence with the modulation system of the child node 20 having the highest multiple value formation level, or in this example, 64 QAM and the modulation systems at an order of a layer lower than 64 QAM (16 QAM and QPSK).

In actually carrying out communication, according to the parent node 10, communication of control block is carried out by using a modulation having the lowest multiple value formation level among the modulation sets. The modulation system having the lowest multiple value formation level is utilized in consideration of the fact that the child node 20 capable of carrying out communication only by the communication system having the lowest multiple value formation level participates in the wireless communication network.

In this case, as a method of selecting the modulation system of the child node 20, two of static selection and dynamic selection are conceivable and either of the selection methods is adopted in accordance with a wireless communication system.

In the case of the static selection, the respective child nodes 20 can select modulation systems which are different from each other depending on the purpose of communication. Further, communication is carried out by always using the modulation systems. In respect of the parent node 10, the modulation system of the parent node 10 is switched in accordance with the modulation system of a counterpart of communication such that the modulation system of the parent node 10 becomes equal to the modulation system of the child node 20 constituting the counterpart of communication.

Also in the case of dynamic selection, the respective child nodes 20 can select the modulation systems which are different from each other depending on the purpose. However, in the case of the dynamic selection, the modulation system for use is switched in accordance with a communication state.

For example, when a communication position of the child node 20 is changed relative to the parent node 10, in the case where the communication distance of the child node 20 relative to the parent node 10 is prolonged, in accordance therewith, the modulation system is dynamically changed to that having a lower multiple value formation level such that 64 QAM to 16 QAM to QPSK.

In this way, regardless of the communication distance, communication having excellent communication quality or a bit error rate can always be provided. In addition thereto, the modulation system in accordance with the communication distance and the communication speed can be selected and therefore, communication having flexibility can be realized and as a result, communication range of the child node 20 can be expanded.

Figure 5:
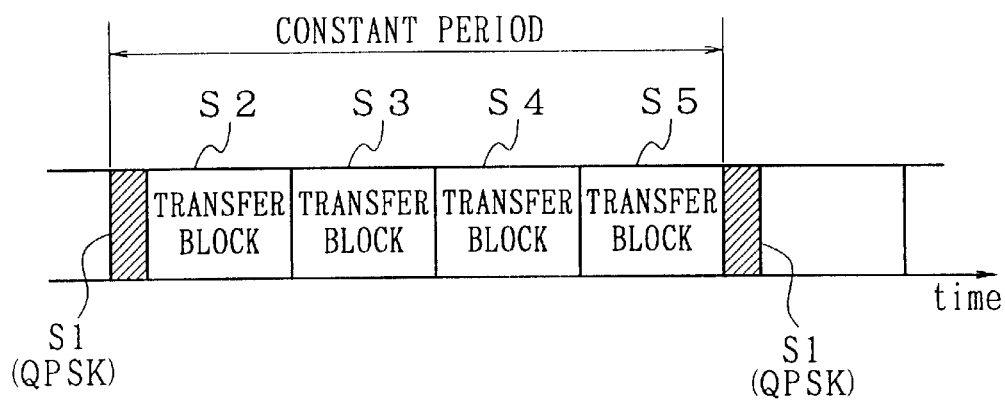
FIG. 5 is a diagram showing a behavior of a transmission signal on a simplified time axis according to the embodiment of the present invention.

FIG. 5 shows an example of time division communication when optical communication is carried out between the parent node 10 and the plurality of child nodes 20, control blocks S1 are periodically transmitted from the parent node 10 and an interval between the control blocks Sl is equally divided into a plurality of time slots. A number of the divisions is made to correspond to a number of the child nodes 20 and a plurality of time slots can be set also in consideration of transmission from the parent node 10 when the same transmission chance can be given. Naturally, a composition can be constructed such that one child node uses a plurality of slot times.

The example of FIG. 5 shows the latter case and time division communication is constituted in consideration of transmission chance from the parent node 10. In FIG. 5, the interval is time-divided in four and the child node 20 carries out communication by utilizing only an allocated time slot. To which time slot and to which child node 20 transmission chance is given can be known by analyzing content of control signals inserted into the control block S1. The order of transmission of the child nodes 20 may be fixed or variable.

Further, synchronization of the child node 20 in respect of the parent node 10 is established by using the control block S1 and the content of the control signals can be grasped by demodulating the control signals after establishing the synchronization.

Now, in FIG. 5, firstly, a transmission block S2 in respect of the parent node 10 is transmitted from the child node 20A by using the modulation system of 64 QAM. A successive transmission block S3 is allocated as a time slot from the child node 20B to the parent node 10 and in this case, data is transmitted by the modulation system by QPSK.

In the case of successive transmission block S4, data is transmitted from the parent node 10 to the child node 20A by utilizing the transmission system of 64 QAM. Further, a transmission block S5 from the child node 20C to the parent node 10 is transmitted by using 16 QAM.

The control block S1 is transmitted by using the modulation system having the lowest multiple value formation level from among the modulation sets. Therefore, error tolerance of the control block S1 is intensified. The signal of the control block S1 can be demodulated by all of the child nodes 20.

The reason is that the child node 20 which can handle the modulation systems having high multiple value formation levels among the modulation sets, can handle the modulation system having a multiple value level lower than that of the above-described modulation system without expanding circuits.

A synchronizing circuit in correspondence with the modulation system having a low multiple value formation level is provided with a circuit constitution which is more simple than that of a synchronizing circuit in correspondence with the modulation system having a high multiple value formation level and accordingly, the cost is inexpensive.

Figure 6:
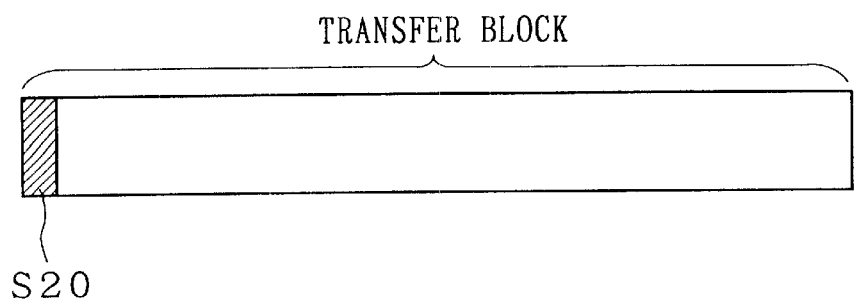
FIG. 6 is a diagram showing a constitution of a transmission block.

Further, as shown by FIG. 6, an information signal S20 indicating the modulation system selected by the side of the child node 20 can be inserted into the transmission block and accordingly, the parent node 10 can immediately set the modulation system in respect with the child node 20 by analyzing the information signal S20 by which setting of the modulation system of the parent node 10 is facilitated. Further, the length of the transmission block may be a fixed length or a variable length. Further, when the information signal S20 is provided with QPSK as the modulation system as in the control block S1, error tolerance is intensified.

Now, a detailed explanation will be given of an embodiment of the parent node 10 and the child nodes 20 which is used in the case where the above-described wireless communication network is realized in reference to FIG. 7.

Figure 7:
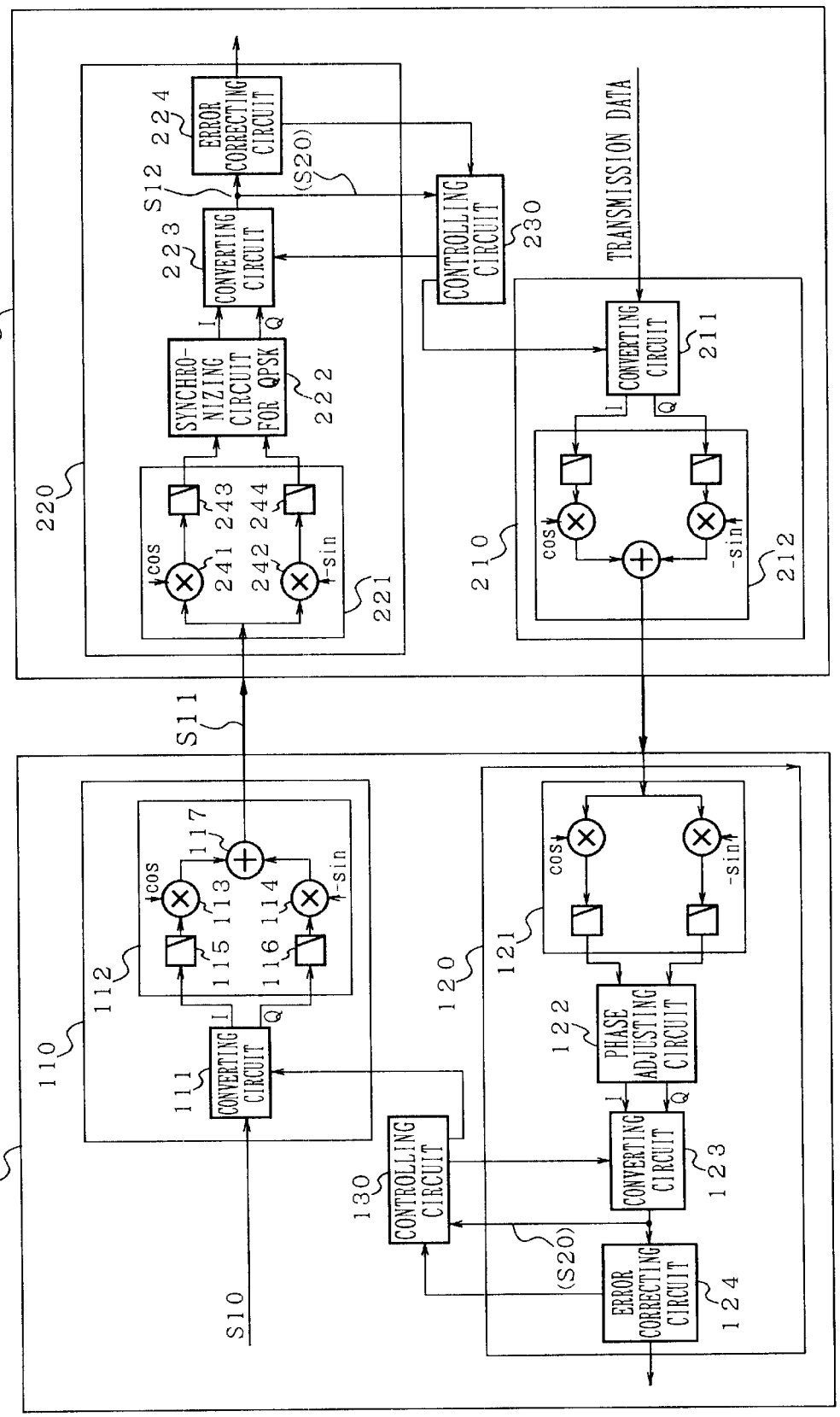
FIG. 7 is a block diagram of a control apparatus (communication apparatus) showing one embodiment of the present invention.

In FIG. 7, when the parent node 10 transmits the control block S1, the above-described control block S1 is inputted to a converting circuit 111 as transmission data S10. The converting circuit 111 converts the transmission data S10 into data having two quadrature components of same phase component I and a quadrature component Q. In the case of QPSK conversion, I and Q respectively have two values. Further, in the case of 16 QAM they become four values, in the case of 64 QAM, they become eight values and in the case of 256 QAM, they become sixteen values.

Instruction of to which conversion system the data is converted is carried out by a controlling circuit 130 constituted by CPU (central processing unit). Transmission data for the control block is transmitted at the lowest multiple value formation level as mentioned above and therefore, I and Q signals become two value data. Thereafter, the I and Q signals are subjected to quadrature modulation by a quadrature modulator 112.

Therefore, a pair of multipliers 113 and 114 are installed to the quadrature modulator 112 and the control block data the band of which has been restricted by filters 115 and 116 is subjected to quadrature modulation by carriers (cosine wave and sine wave) for quadrature modulation. The quadrature-modulated I and Q signals are added together by an adder 117 and an added signal thereof is supplied to light emitting means (not illustrated) as a quadrature-modulated signal. Infrared ray (modulated ray) S11 which has been modulated by the quadrature-modulated signal is transmitted to the side of the child node 20.

The side of the child node 20 is also provided with a light receiving element (not illustrated), the infrared ray S11 is converted into a reception level by this element and thereafter, led to a quadrature demodulator 221 and a demodulation processing is carried out.

Similar to the quadrature modulator 112, the quadrature demodulator 221 is provided with a pair of multipliers 241 and 242 and a pair of filters 243 and 244 and the quadrature-demodulated I and Q signals are supplied to a synchronizing circuit 222. The synchronizing circuit 222 is a synchronizing circuit for QPSK and a synchronization in respect of the parent node 10 is established at the synchronizing circuit 222.

The I and Q signals the synchronization of which has been established are subjected to an inverse conversion processing in respect of the parent node 10 at a converting circuit 223 and reception data S12 is formed from the I and Q signals. The reception data S12 is subjected to error correction by an error correcting circuit 224 and is transmitted to a later stage of a processing circuit (not illustrated).

Data of the transmission blocks shown by FIG. 5 is also transmitted from the parent node 10 to the child node 20 by a similar procedure. However, in this case, the synchronizing circuit 222 is not operated, the reason is that in addition to the fact that they are modulated by a modulation other than QPSK of the transmission block, the synchronization has already been established and therefore, a processing of establishing synchronization at a second time is not needed.

An explanation will be similarly given of transmission of the transmission block from the child node 20 to the parent node 10. In this case, a transmitter 210 installed on the side of the child node 20 is provided with a constitution quite the same as that of the transmitter 110 on the side of the parent node 10 and accordingly, an explanation thereof will be omitted.

Data to be transmitted at the transmitter 210 is supplied to a converting circuit 211 and converted into two quadrature components I and Q signals and the I and Q signals are subjected to quadrature modulation at a quadrature modulator 212. Thereafter, a light emitting element is excited and infrared ray is transmitted to the side of the parent node 10.

The modulation system is instructed by a controlling circuit 230 built in CPU. Further, information of which modulation system is used for modulating data at a front position of the transmission block is transmitted along with data.

In a receiver 120 installed on the side of the parent node 10, different from the side of the child node 20, a phase adjusting circuit 122 is installed between a quadrature demodulator 121 and a converting circuit 123 in place of the synchronizing circuit 222. The synchronizing circuit is dispensed with since the side of the child node 20 has already been synchronized with the parent node 10 and the phase adjusting circuit 122 is installed in place of the synchronizing circuit 222 since phase error caused in transmission needs to correct (adjust).

The I and Q signals the phases of which have been adjusted are recovered to original transmission data by the converting circuit 123. In this case, the control circuit 130 takes out information indicating the modulation system from among received data and the converting circuit 123 is adaptively controlled based thereon. The transmission data outputted from the converting circuit 123 is subjected to an error correction processing by an error correcting circuit 124 and thereafter transmitted to a later stage of a processing circuit (not illustrated).

Now, when the communication position of the child node 20 is moved, the dynamic selecting method is conceivable as the modulation system as mentioned above. In this case, the modulation system used in transmitting the transmission block is adaptively switched.

For example, assume that 16 QAM is used in transmission from the child node 20C to the parent node 10 in FIG. 4. When the child node 20C is moved, the communication distance becomes longer than before and the S/N ratio is deteriorated, transmission having excellent quality cannot be carried out with 16 QAM and accordingly, in this case, the modulation system is automatically switched to QPSK. The switching operation can be carried out by the following procedure.

When the communication distance is prolonged, the S/N ratio of the reception signal of the parent node 10 is deteriorated and further, the S/N ratio of the reception signal of the child node 20 is similarly deteriorated. In this case, at the error correcting circuit 224 shown by FIG. 7, a number of errors (error rate) before correction is increased by deterioration in the S/N ratio. Information with respect to a number of error correction is transmitted from the error correcting circuit 224 to the side of the controlling circuit 230. In the controlling circuit 230, a signal of switching the modulation system is formed in reference to the information of the number of error correction indicating the error rate and is given to the converting circuit 211 by which the modulation system is switched to a side having a low multiple value formation level. The automatic switching of the modulation system can be realized by the above-described processings.

An information signal S20 indicating that the modulation system has been switched is added to the front of the transmission block shown by FIG. 6 as mentioned above and is transmitted to the side of the parent node 10. The information signal S20 is modulated by the modulation system having the lowest multiple value formation level (QPSK). This operation is for being able to analyze the control signal S20 by any of the nodes.

The information signal S20 is supplied from the converting circuits 223 and 123 directly to the controlling circuits 230 and 130. The reason is that the information signal is modulated by the multiple value formation level which is difficult to cause error (QPSK) and accordingly, the error correction processing is not needed. Naturally, the information signal S20 can be given to the control circuits 230 and 130 via the error correcting circuits 224 and 124.

On the side of parent node 10, the modulation system in respect of the converting circuit 111 of the transmitter 110 may be switched simultaneously with switching the modulation system of the converting circuit 123.

When the parent node 10 per se changes its communication position, adaptive switching of the modulation system can also be carried out on the side of the parent node 10. In this case, in accordance with switching the modulation system of the parent node 10, the modulation system of the converting circuit 211 on the side of the child node 20 may be switched.

The adaptive switching of the modulation system may be carried out in reference to the reception level of the reception signal. In this case, the modulation system is switched to a side having a low multiple value formation level by detecting that the reception level becomes equal to or lower than a reference level. As the reference level, one or more of reference levels having different values are prepared.

In respect of switching the modulation system, other than the adaptive switching described above, for example, the modulation system can also be switched based on external information by instruction from an upper order layer or the like. In this case, a method in which an upper order layer of other one of the child node 20 switches the modulation system for transmission of the parent node 10 or the like is conceivable other than a method in which an upper order layer of the parent node 10 switches the modulation system for transmission of the parent node 10.

Further, when the parent node 10 transmits the transmission block to the child node 20, the transmission may be carried out by using the modulation system having a multiple value formation level lower than that of the modulation system selected by the child node 20.

For example, when the parent node 10 intends to transmit the same data to the child node 20A and child node 20C in FIG. 4, it is more effective to transmit the data simultaneously than to transmit the same data to respective child nodes separately. In such a case, the same data may be transmitted by the modulation system (for example, 16 QAM, QPSK) which can be handled by the two child nodes 20A and 20C. At this occasion, by transmitting the information signal S20 identifying the modulation system to the side of the child nodes 20 as shown by FIG. 7, switching of the demodulation system on the side of the child nodes 20 becomes smooth.

Although according to the above-described embodiment, the amplitude modulation systems of QPSK, 16 QAM, 64 QAM, 256 QAM and so on have been exemplified as the modulation sets, otherwise, an arbitrary number of the modulation systems may be selected from among the quadrature amplitude modulation systems as the modulation sets. For example, the quadrature amplitude modulation sets of QPSK, 16 QAM, 32 QAM or the like are conceivable.

Further, an arbitrary number of modulation systems can be selected from among phase modulation systems of BPSK (binary phase shift keying), QPSK (quadrature phase shift keying), 8PSK and so on. Further, an arbitrary number of modulation systems can be selected as modulation sets from among frequency modulation systems of FPSK (frequency phase shift keying), 4 FSK, 8 FSK and so on. An arbitrary number of modulation systems may be selected as modulation sets from among amplitude modulation systems of BVSB (binary vestigial sideband modulation), 4 VSB, 8 VSB and so on.

Naturally, an arbitrary number of modulation systems may be selected as modulation sets from among quadrature amplitude modulation systems and phase modulation systems.

As has been explained, according to the embodiment, the modulation sets comprising the same kind of the modulation system having the different multiple value formation levels are prepared, the modulation system is selected from among the modulation sets in accordance with the communication distances and the communication speeds necessary for controlled control apparatuses and accordingly, the following effects are achieved.

Firstly, a pertinent modulation system can be selected from among modulation sets in accordance with necessary communication distance and communication speed and therefore, a wireless communication network having flexibility can be constructed.

Secondly, all of control apparatuses as child nodes may be provided with only synchronizing circuits in respect of a modulation system having a lowest multiple value formation level in modulation sets. According to the synchronizing circuit, the higher the multiple value formation level of a modulation system, the more complicated and the more expensive the synchronizing circuit. According to the present invention, simple synchronizing circuits can be used and accordingly, circuit scale of a total of a wireless communication system can be reduced.

Thirdly, in the case of optical communication using infrared ray, influence of multiple paths or the like is difficult to receive and accordingly, there are provided features in which stable communication as well as simple modulation switching processing can be expected within communication distance. Accordingly, the present invention is extremely preferably applied to a control apparatus participating in a wireless communication network by optical communication.

Even light ray other than infrared ray is difficult to undergo influence of fading or multiple paths similar to infrared ray since its wavelength is short and accordingly, optical communication similar to the above-described can be realized by using light ray other than infrared ray.

Meanwhile, optical communication, particularly infrared ray may be used in communication used in the above-described wireless communication network. Influence of multiple paths is present in communication using infrared ray and therefore, a maximum communication distance may not be determined uniquely. Further, even at a location of a small communication distance, communication may be interrupted and a wireless communication system which is devoid of reliability may be constituted for a user.

Particularly, when a modulation system is statically selected, the modulation system used by the respective child nodes 20 is fixed and accordingly, a maximum communication distance and a communication speed are determined thereby. When the maximum communication distances and the communication speeds with regard to the respective child nodes 20 are not clarified, a wireless communication system which is difficult to be understood by a user may be constituted.

Further, even when the communication system is dynamically selected, a relationship between an S/N ratio and the communication distance is not uniquely established and the modulation system cannot be switched in accordance with the communication distance. Therefore, the communication system cannot be switched by comparative simple control and complicated switching control is obliged to carry out.

Hence, in order to resolve the above-described inconvenience, a detailed explanation will be given of other embodiment of the present invention in reference to the drawings. FIG. 8 shows a constitution of an optical transmission apparatus expressing the function blocks of FIG. 7 and added with an optical transmission unit. An optical transmission apparatus 10 is constituted by a transmitter 20 and a receiver 30, and transmission data TD is added with an error correction code of, for example, Reed-Solomon code at a data transmission processing unit 21 of the transmitter 20 and is supplied to a modulating unit 22. At the modulating unit 22, a transmission signal TS is formed by subjecting data supplied from the data transmission processing unit 21 to quadrature conversion of, for example, quadrature phase modulation (hereinafter, referred to as "QPSK"), 16 value quadrature amplitude modulation (hereinafter, referred to as 16 QAM") or the like. The transmission signal TS is supplied to a driving unit 24 after attenuating components except a modulation signal component by a band path filter 23. A drive signal DR is formed at the driving unit 24 based on the transmission signal TS of which band is restricted. A light emitting unit 25 is driven by the drive signal DR and an optical signal LS is radiated from the light emitting unit 25. When the optical signal LS is received by a light receiving unit 31 of the receiver 30 constituting receiving means, a current signal is formed based on the optical signal LS received by photoelectric conversion at the light receiving unit 31 and is supplied to an I-V converting unit 32. At the I-V converting unit 32, the current signal is converted into a voltage signal and is amplified by an amplifier 33 to constitute a reception signal RS. The reception signal RS is supplied to a band path filter 34 and is supplied to AGC (automatic gain controller) 35 by attenuating components except a modulation signal component. At the AGC unit 35, the signal level of the reception signal RS is constituted to a predetermined signal level and is supplied to an A/D (analog to digital) converter 36. The A/D converting unit 36 converts a signal supplied from the AGC unit 35 into a digital data signal and the data signal is subjected to waveform equalization at a waveform equalizing unit 37 to constitute a data signal SD. The data signal SD is demodulated by being supplied to a demodulating unit 38, a data signal provided by the demodulation is subjected to error correction by an error correcting unit 39 and correct reception data RD can be provided from the error correcting unit 39.

According to the optical transmission apparatus 10 constituted as mentioned above, in order to prevent influence of multiple paths, an optical signal restricting unit for restricting multiple paths by a light emitting element of the light emitting unit 25 or a light receiving element of the light receiving unit 31 is installed. According to the light signal restricting unit, restriction of multiple paths is carried out by controlling a radiation angle of an optical signal at the light emitting unit 25 or a light receiving angle of an optical signal at the light receiving unit 31. As the optical signal restricting unit, for example, a light blocking tube or an optical lens is used. FIG. 9A shows a case in which a light blocking tube 51 is used as the optical signal restricting unit and a light absorbing member 52 is attached to an inner face side of the light blocking tube 51. The light blocking tube 51 constituted as mentioned above is attached to a light emitting element 251 of the light emitting unit 25 or a light receiving element 391 of the light receiving unit 31 by which the optical signal LS is not reflected by the inner face side of the light blocking tube 51 and the radiation angle or the light receiving angle of the optical signal LS from an angle "α" to a predetermined angle "β" relative to a central axis in a radiation direction or a light receiving direction. Further, FIG. 9B shows a case in which an optical lens (deflection lens) 53 is used as the optical signal restricting unit, the optical lens 53 is arranged on the front face side of the light emitting element 251 or the light receiving element 391 and similar to FIG. 9A, the radiation angle or the light receiving angle of the optical signal LS is correctly controlled to the predetermined angle "β".

Figure 10:
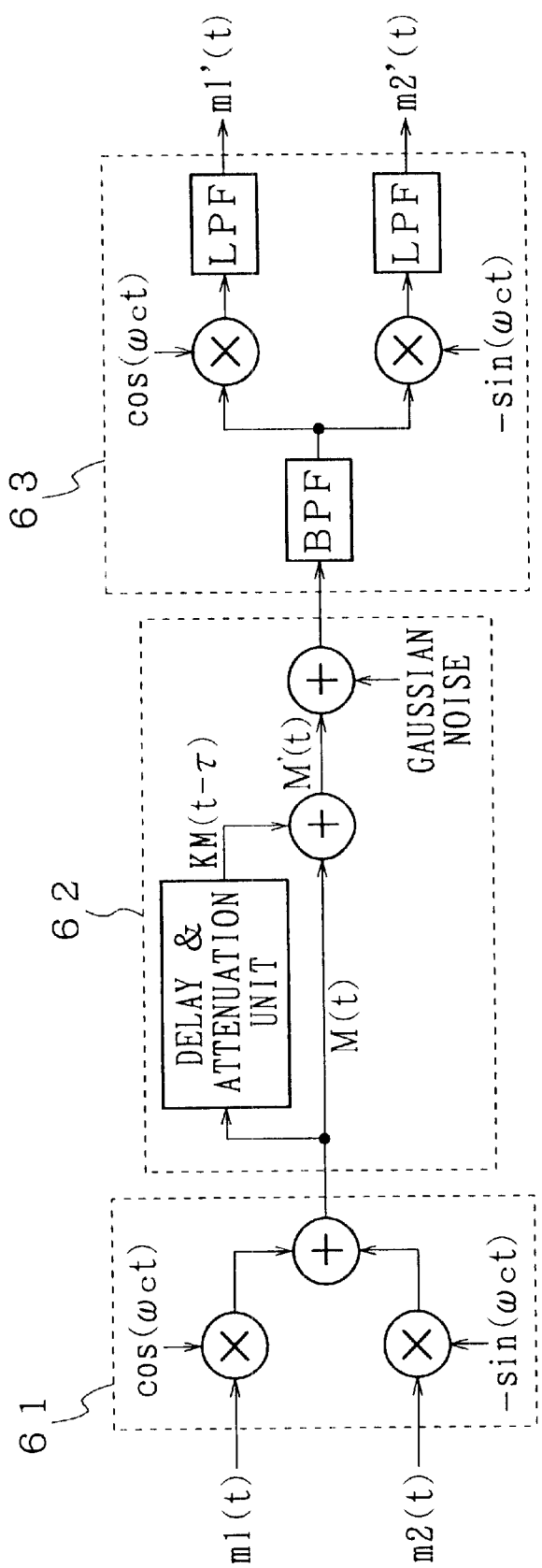
FIG. 10 is a diagram showing a simulation circuit.

Next, an explanation will be given of a method of restricting multiple paths. FIG. 10 shows a constitution of a simulation circuit for confirming influence of multiple paths. In this case, data of, for example, M series code is used as transmission data and the data is distributed by processings of series and parallel conversion and so on and constitutes input data m1(t) and input data m2(t).

At a conversion processing unit 61, the input data m1(t) is multiplied by a carrier wave cos (ωct) and the input data m2(t) is multiplied by a carrier wave −sin(ωct) and by adding input data m1(t) and m2(t) respectively multiplied by the carrier waves, a transmission signal M(t) shown by Equation (1) which is a modulation signal is formed. The transmission signal M(t) constitutes the optical signal LS.

$$M(t)=m1(t)\cos(\omega ct)-m2(t)\sin(\omega ct) \quad (1)$$

where ωc=2πfc and notation fc designates a frequency of the carrier waves.

At a transmitting unit 62, the transmission signal M(t) is delayed by a delay time "τ" and by attenuating a signal level of the delayed transmission signal M(t−τ) based on an attenuation coefficient "k", a multiple path kM(t−τ) is formed. By adding the transmission signal M(t) and the multiple path kM(t−τ), a reception signal M'(t) is provided as shown by Equation (2).

$$M'(t)=M(t)+kM(t-\tau) \quad (2)$$

Further, although not shown in Equation (2), the reception signal M'(t) is added with Gaussian noise as noise in transmission.

At a demodulation processing unit 63, a modulation signal component is extracted from the reception signal M'(t) by using a band path filter, which is multiplied by the carrier waves cos(ωct) and −sin(ωct) by which the demodulation processing is carried out. By subjecting data provided by the demodulation processing to band restriction by a low pass filter, reception data is constituted by data m'1(t) and m'2(t) shown by the following Equation (3).

$$\begin{bmatrix} m'1(t) \\ m'2(t) \end{bmatrix} = \begin{bmatrix} m1(t) \\ m2(t) \end{bmatrix} + k \begin{bmatrix} \cos(\bar{\omega}c\tau) & \sin(\bar{\omega}c\tau) \\ -\sin(\bar{\omega}c\tau) & \cos(\bar{\omega}c\tau) \end{bmatrix} \begin{bmatrix} m1(t-\tau) \\ m2(t-\tau) \end{bmatrix} \quad (3)$$

By using the simulation circuit, Gaussian noise is adjusted such that a bit error rate of the reception data m'1(t) and m'2(t) becomes, for example, BER (bit error rate)=10-6, a delay amount of a signal whereby an S/N ratio of the reception data m'1(t) and m'2(t) become equal to those in a state where multiple paths are not present, is investigated and adverse influence is avoided by restricting multiple paths having a delay amount larger than the above-described delay amount.

In this case, as factors for influencing the S/N ratio, a roll-off rate, a reflection coefficient, a transfer distance, a symbol rate, a frequency of a carrier and an S/N ratio in a state where multiple paths are not present are conceivable. In the following, relationships between the respective items and the S/N ratio of a reception signal are shown by FIG. 12 through FIG. 18. Further, a symbol rate designates a number of bits of symbols transferred in one second and in the case of QPSK, by processing data of an M series code shown by FIG. 11A by series and parallel conversion or the like, input data image m1(t) and input data m2(t) shown by FIG. 11B and FIG. 11C are constituted, one bit of the input data m1(t) and the input data m2(t), that is, two bits of data of the M series code constitute 1 symbol and "TS" constitutes one symbol period. Further, data of 4 bits of the M series code is transmitted by 1 symbol.

In FIG. 12 through FIG. 18, the modulation system is set to QPSK, the symbol rate is set to 12.5 Mbps, the frequency of a carrier is set to 16 MHz, the transfer distance is set to 10 m, the roll-off rate is set to 30%, the reflectivity is set to 1 (100%) and a necessary S/N ratio is set to 13.5 dB and values are made variable for respective items.

Figure 12:
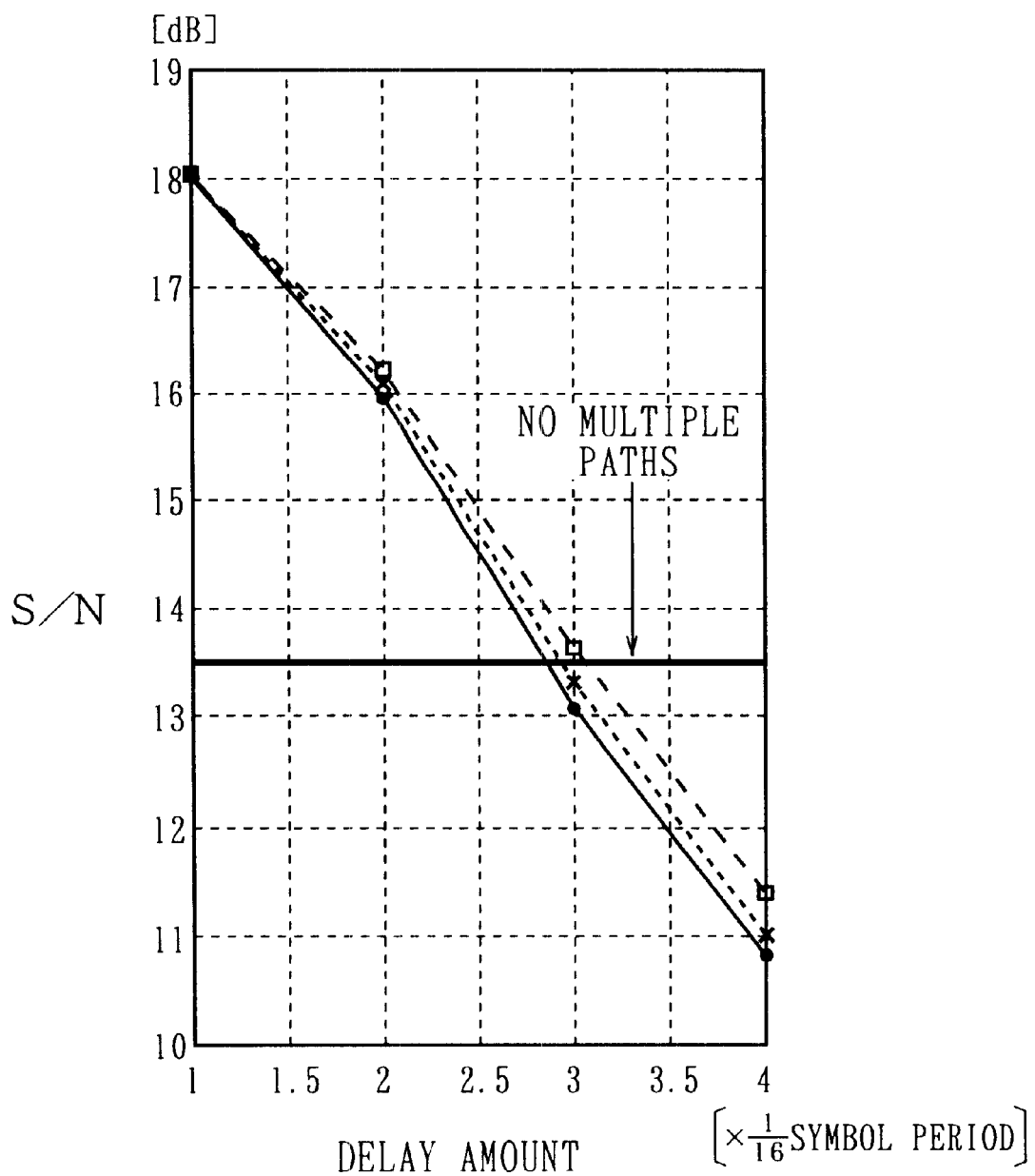
FIG. 12 is a diagram showing a relationship between a delay amount and an S/N ratio of reception data when the roll-off rate is made variable.

FIG. 12 shows a relationship between a delay amount of a signal and the S/N ratio of m1'(t), m2'(t) when the roll-off rate is set to 20%, 30% and 50%. As shown by FIG. 12, although the larger the roll-off rate, the larger a limit delay amount (a delay amount by which the S/N ratio is equal to an S/N ratio in a state where multiple paths are not present), a difference in the limit delay amount is as small as about (0.2/16) symbol period and accordingly, the influence of the roll-off rate is considerable.

Figure 13:
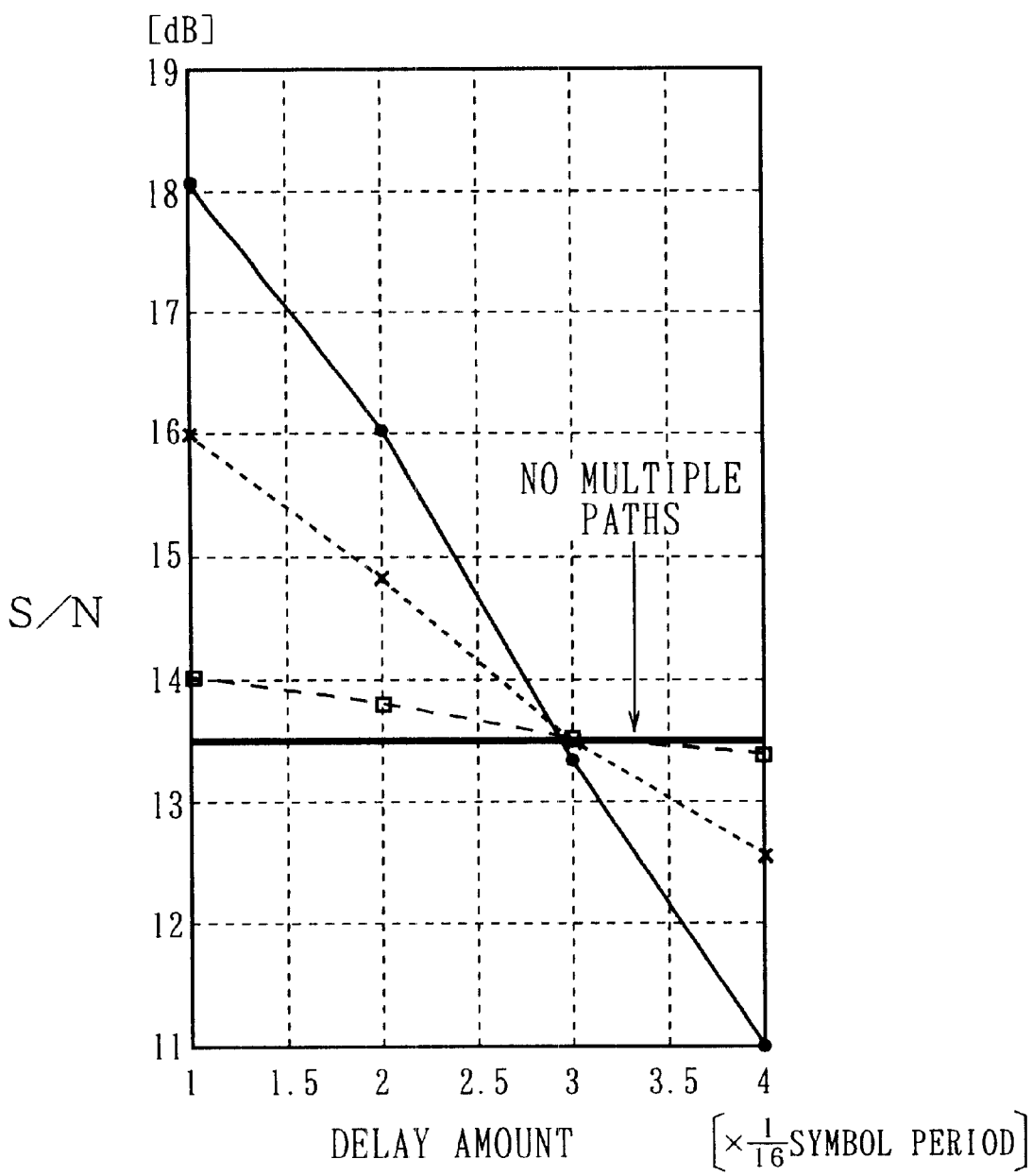
FIG. 13 is a diagram showing a relationship between a delay amount and an S/N ratio of reception data when reflectivity is made variable.

Next, FIG. 13 shows a relationship between a delay amount and the S/N ratio of the reception data m1'(t) and m2'(t) when the reflectivity of an optical signal by a reflecting object is set to 1, 0.5 and 0.1 and the S/N ratio of the reception data m1'(t) and m2'(t). As shown by FIG. 13, the larger the reflectivity, the smaller the limit delay amount, however, a difference in the limit delay amount is inconsiderable.

Figure 14:
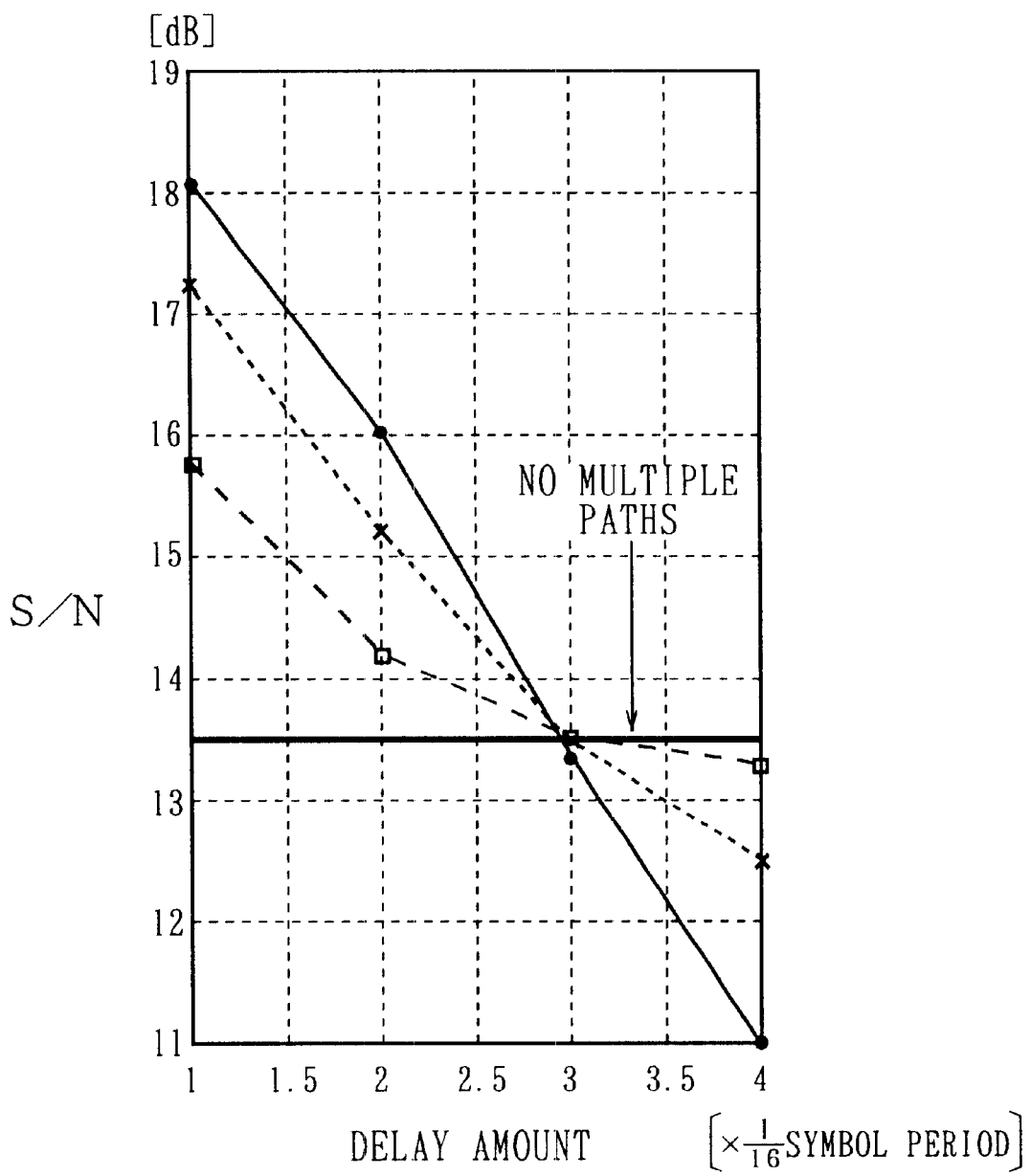
FIG. 14 is a diagram showing a relationship between a delay amount and an S/N ratio of reception data when a transmission distance is made variable.

FIG. 14 shows a relationship between a delay amount and the S/N ratio of the reception data m1'(t) and m2'(t) when the transfer distance is set to 2 m, 5 m and 10 m. Although the larger than transfer distance, the smaller the limit delay amount, a difference in the limit delay amount is inconsiderable.

Figure 15:
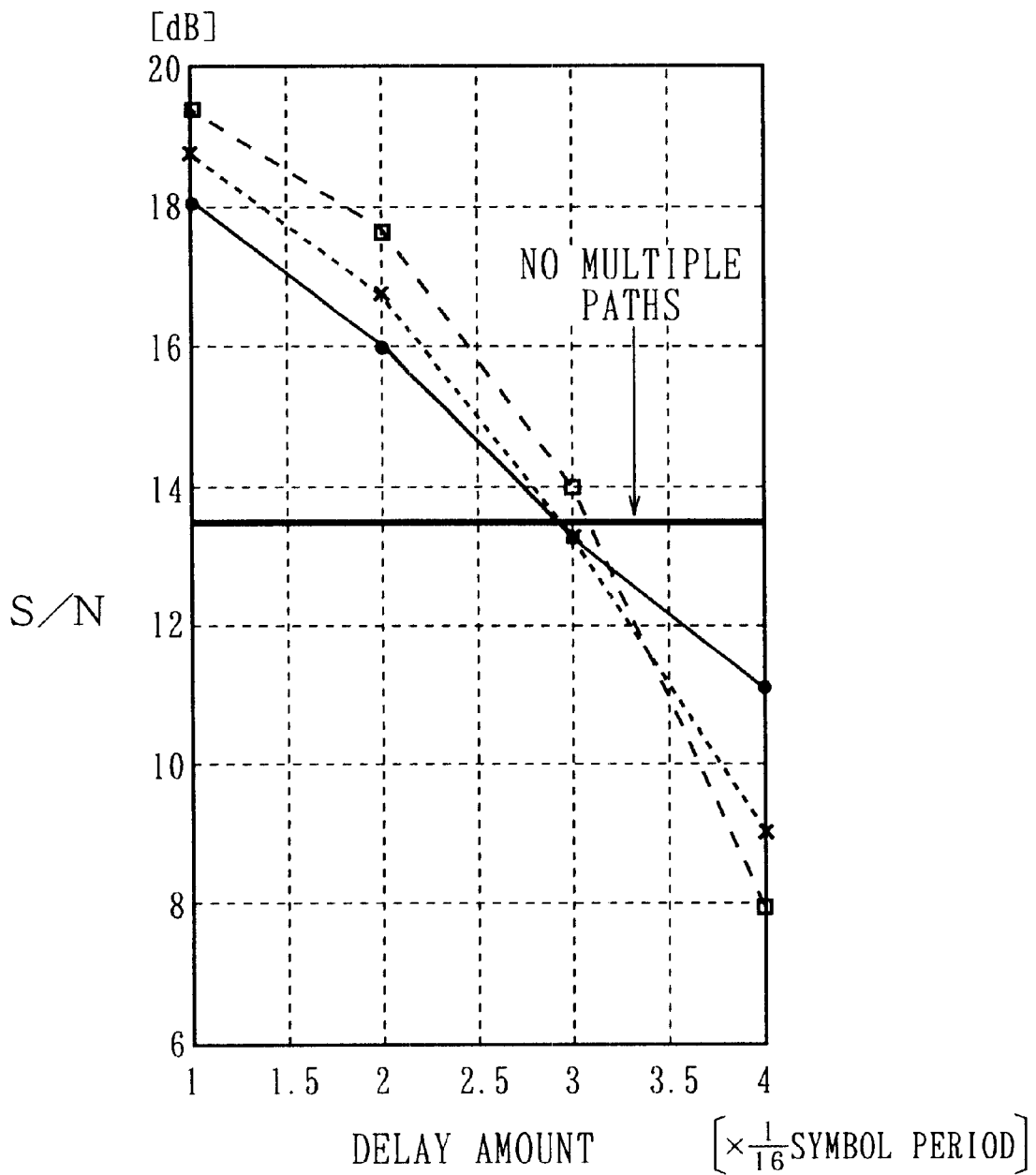
FIG. 15 is a diagram showing a relationship between a delay amount and an S/N ratio of reception data when a symbol rate is made variable.
Figure 16:
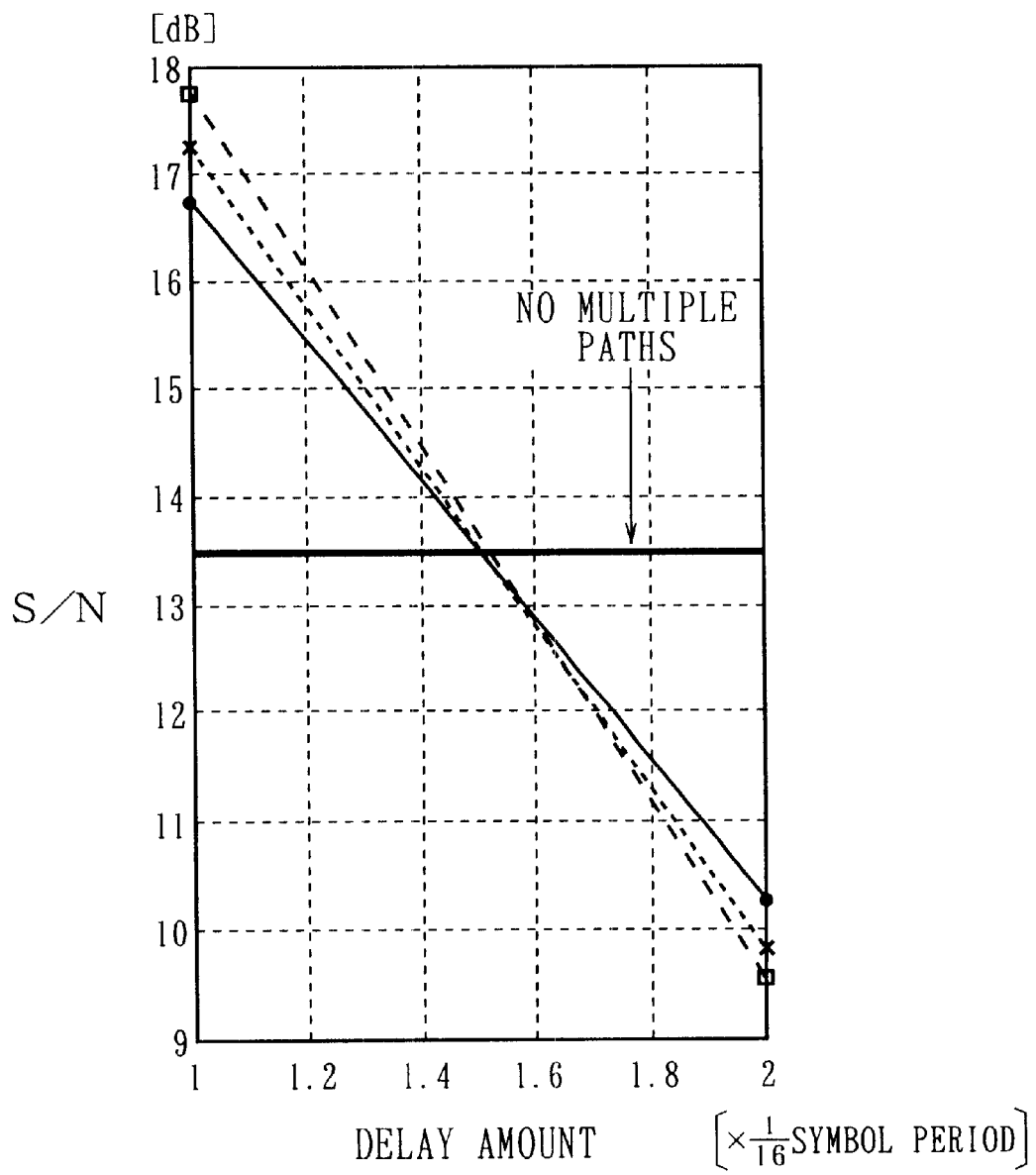
FIG. 16 is a diagram showing a relationship between a delay amount and an S/N ratio of reception data when a symbol rate is made variable.

FIG. 15 and FIG. 16 show relationships between delay amounts and the S/N ratio of the reception data m1'(t) and m2'(t) when a ratio K of the frequency fC of the carrier and the symbol rate sr of transferred data is set to be constant (K=1.28 in FIG. 15 and K=2.88 in FIG. 16) and the symbol rate sr is set to fC=12.5 Mbps, 25 Mbps and 400 Mbps. As shown by FIG. 15 and FIG. 16, when K is constant, a difference in the limit delay amount is small.

Figure 17:
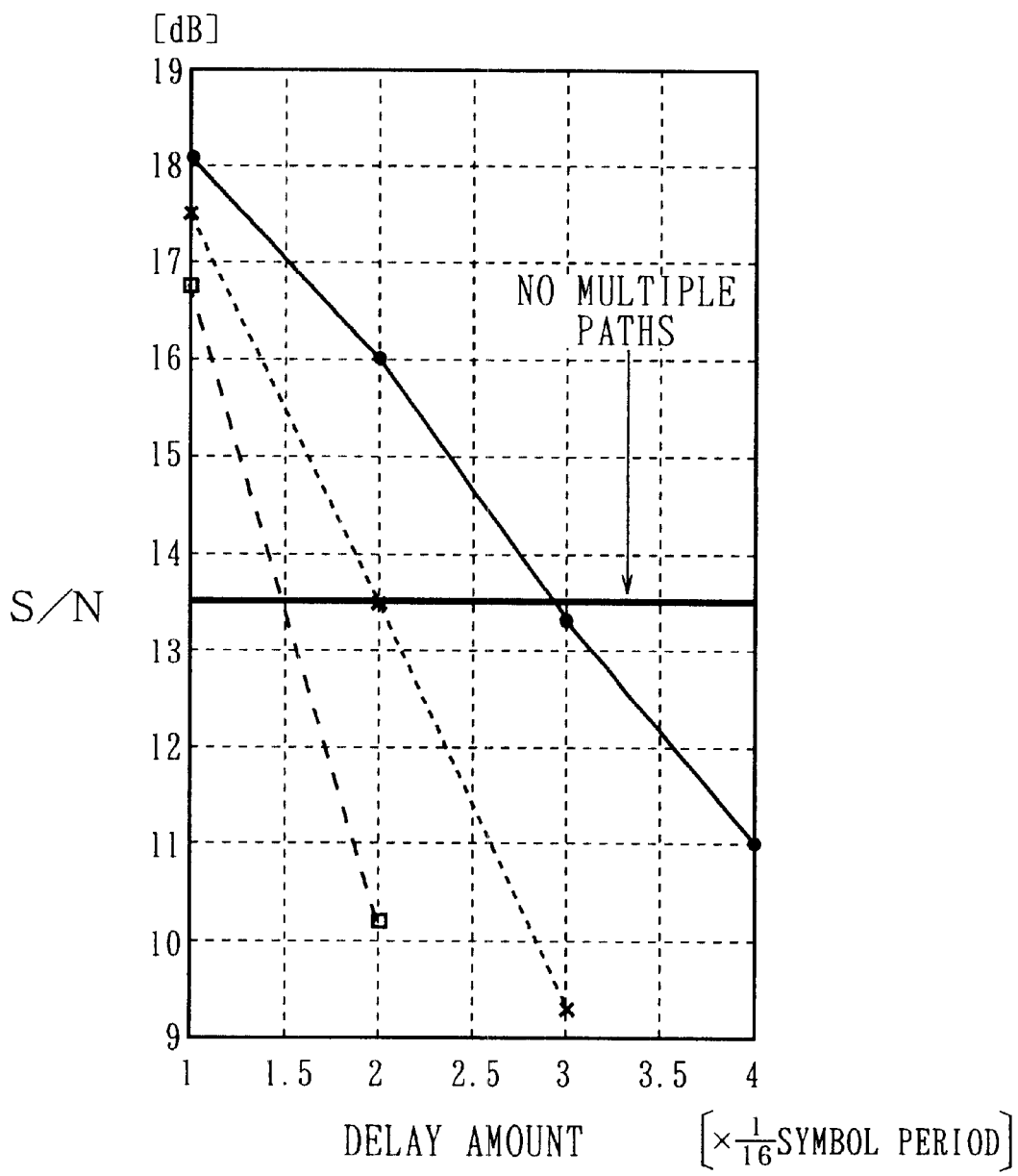
FIG. 17 is a diagram showing a delay amount and an S/N ratio of reception data when a ratio of a frequency of a carrier wave to a symbol rate is made variable.

FIG. 17 shows a relationship between a delay amount and the S/N ratio of the reception data m1'(t) and m2'(t) when the ratio K of the frequency fc of the carrier to the symbol rate sr of transferred data is set to 1.28, 2.08 and 2.88. The larger the value of the ratio K, the smaller the limit delay amount. For example, when the ratio K is 1.28, the limit delay amount is about (2.9/16) symbol period or more, however, when the ratio K is set to 2.08, the limit delay amount is as small as about (2.1/16) symbol period and when the ratio K is set to 2.88, the limit delay amount is further reduced to about (1.5/16) symbol period. In this way, the limit delay amount is made to significantly differ by the ratio K of the frequency fc of the carrier to the symbol rate sr of transferred data.

Figure 18:
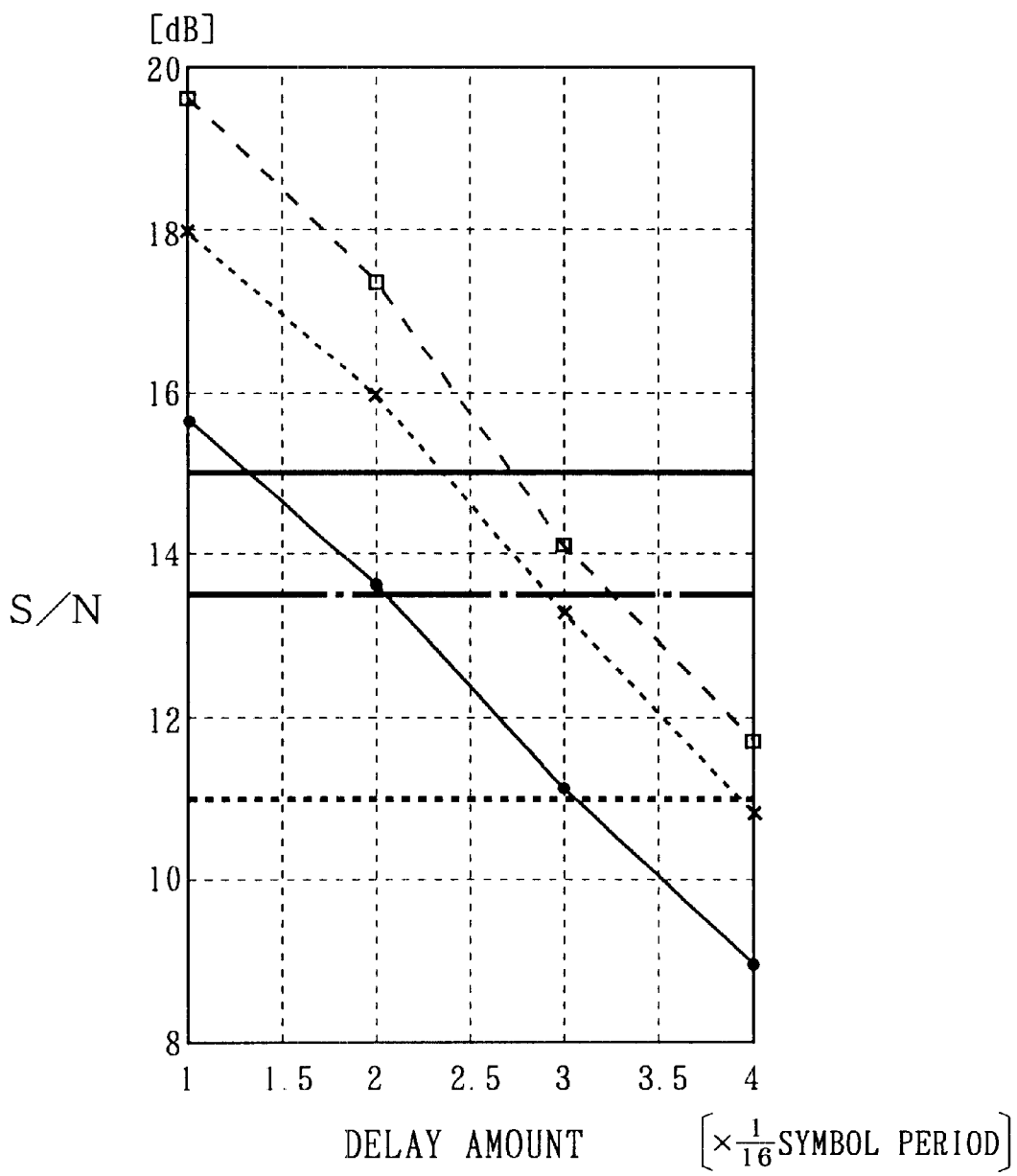
FIG. 18 is a diagram showing a relationship between a delay amount and an S/N ratio of reception data when the S/N ratio is made variable in a state where multiple paths are not present.

FIG. 18 shows a relationship between a delay amount and the S/N ratio of the reception data m1'(t) and m2'(t) when the S/N ratio is set to 11 dB, 13.5 dB and 15 dB in a state where multiple paths are not present. There is shown a significant characteristic in which when the S/N ratio is large, the limit delay amount is small and when the S/N ratio is small, the limit delay amount is large.

Figure 19:
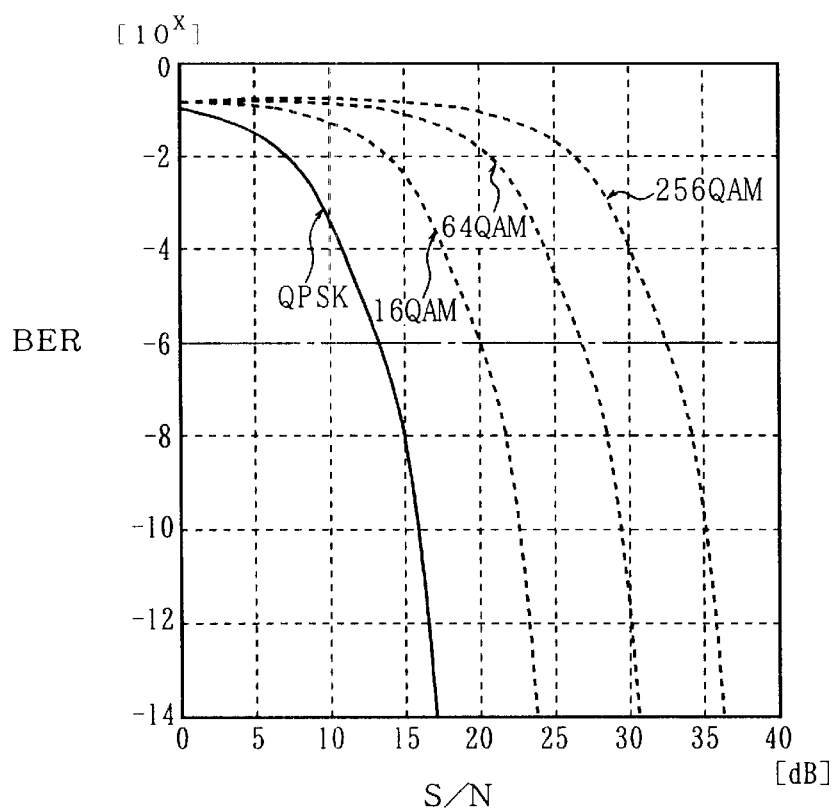
FIG. 19 is a diagram showing a relationship among a modulation system, an S/N ratio and a bit error rate.

FIG. 19 shows a relationship among the modulation system, the bit error rate and the S/N ratio and the S/N ratio constituting a predetermined bit error rate is calculated in the respective modulation systems based on FIG. 19. For example, when a range of the S/N ratio is set in accordance with the respective modulation systems such that the bit error rate becomes 10-6 or less in a state where error correction is not carried out, the larger the S/N ratio, the smaller the bit error rate. That is, the larger the S/N ratio, the larger the limit delay amount.

From the above-described, with regard to influential power of multiple paths, the ratio of the symbol rate to the frequency of the carrier is determined to be a significant factor for determining the limit delay amount and the smaller the S/N ratio, the larger the limit delay amount.

In the following, the limit delay amount is detected in cases of, for example, QPSK, 16 QAM, 64 value quadrature amplitude modulation (hereinafter, referred to as "64 QAM") and 256 value quadrature amplitude modulation (hereinafter, referred to as "256 QAM") as modulation systems.

Figure 20:
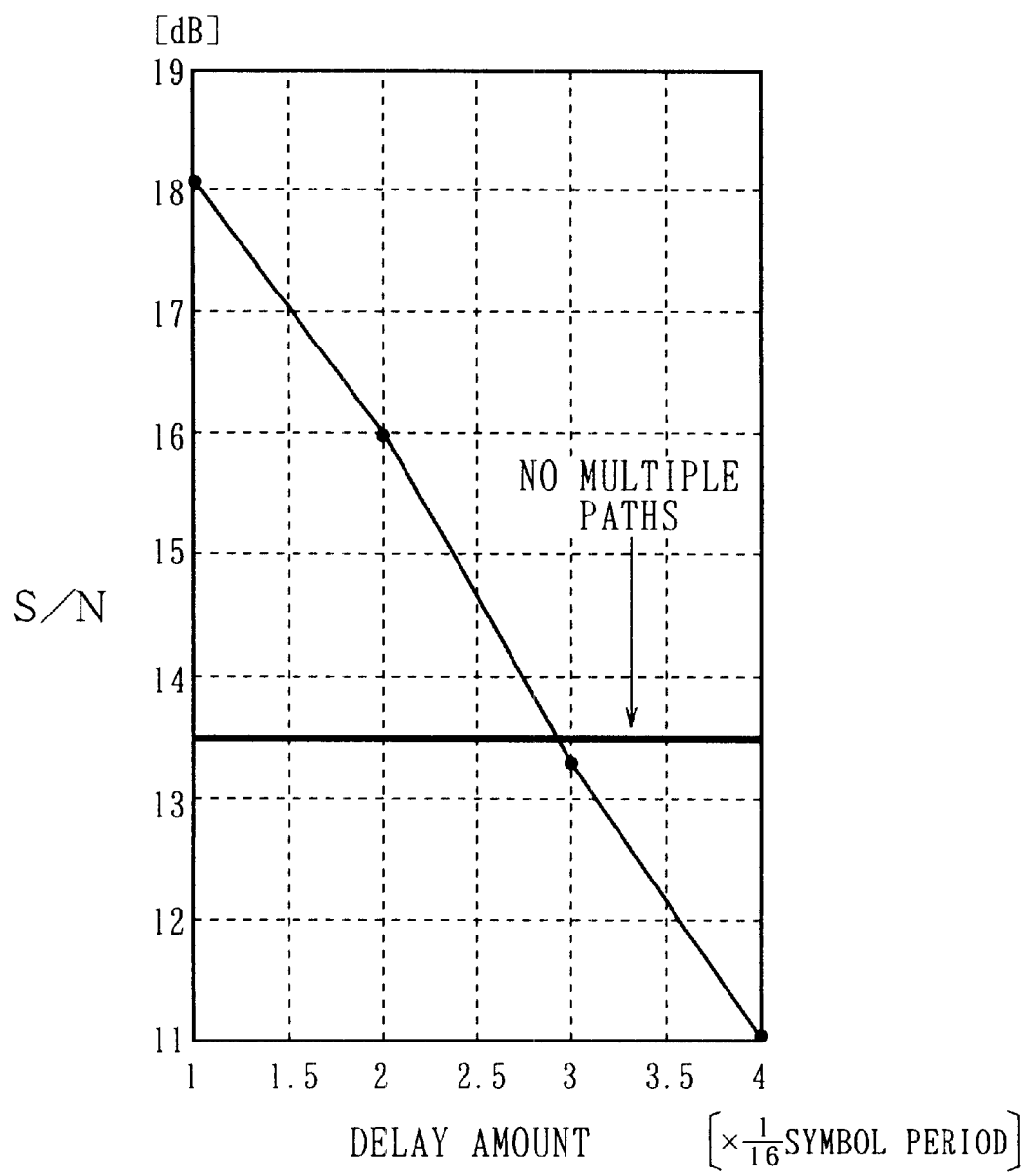
FIG. 20 is a diagram showing a relationship between a delay amount of a reflection signal and an S/N ratio of reception data.

First, in the first case, in respect of a signal modulated by QPSK, FIG. 20 shows a relationship between a delay amount of the signal and the S/N ratio of the reception data m1'(t) and m2'(t) when the error rate is set to 10-6 (S/N=13.5 dB) with no ECC, the reflection coefficient is set to 1, the roll-off rate is set to 30%, the transmission distance is set to 10 m, the symbol rate is set to 12.5 MHz and the frequency of a carrier is set to 16 MHz. As is apparent from FIG. 20, when the delay amount is equal to or lower than about 2.9/16 symbol period (about 18.1% of 1 symbol period) directly in respect of the signal, the S/N ratio is not deteriorated than in a case where multiple paths are not present and no adverse influence by multiple paths is resulted.

Therefore, in order to restrict multiple paths having a large delay amount and effecting adverse influence, a radiation angle or a light receiving angle is calculated by an optical signal restricting unit.

Figure 21:
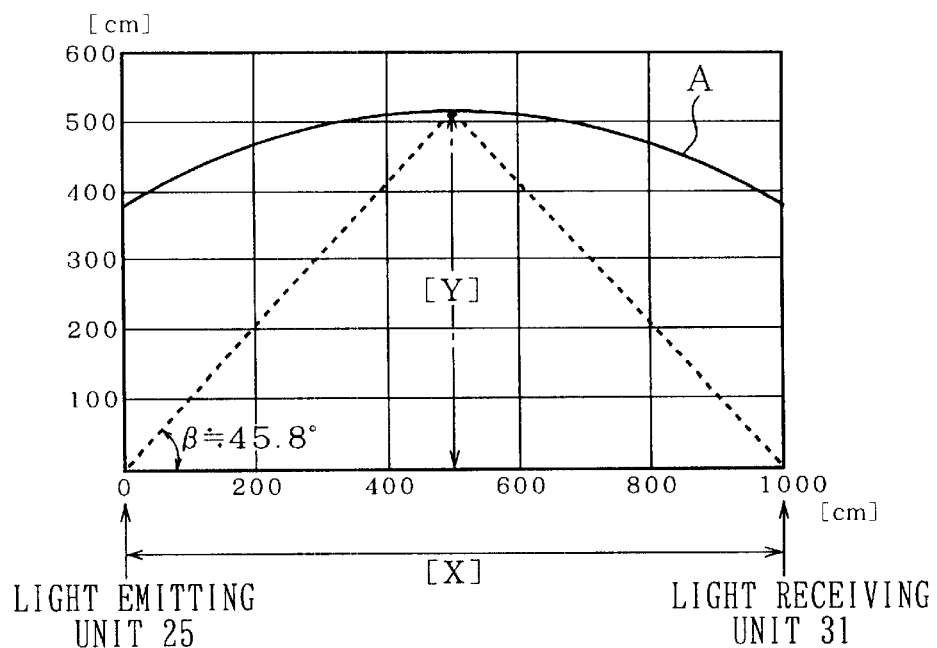
FIG. 21 is a diagram showing a restriction angle.

In this case, when a distance from the light emitting unit 25 to the light receiving unit 31 is designated by notation "x" and a length of a perpendicular line fallen from a reflecting position to a line connecting the light emitting unit 25 and the light receiving unit 31 is designated by "y", the following Equation (4) shows a positional relationship in which the S/N ratio is equal to an S/N ratio in the case where multiple paths are not present which is indicated by a bold line A of FIG. 21.

$$y=\sqrt{(-0.51438x^2+514.38041x+136211.147474)} \quad (4)$$

When an optical signal is reflected at outside of the position shown by the bold line A, the delay amount is increased, and the S/N ratio is deteriorated more than in the case where multiple paths are not present and accordingly, the radiation angle of the light emitting unit 25 and the light receiving angle of the light receiving unit 31 are set such that a signal reflected from outside of the position shown by the bold line A can be restricted. For example, when the radiation angle of the light emitting unit 25 is made equal to the light receiving angle of the light receiving unit 31, adverse influence of multiple paths can be prevented by setting the angles to β≈45.8.

In the second case, with regard to a signal modulated by QPSK, FIG. 22 shows a relationship between a delay amount and the S/N ratio of the reception data m1'(t) and m2'(t) when the error rate is set to 10-6 (S/N=13.5 dB) with no ECC, the reflection coefficient is set to 1, the roll-off rate is set to 30%, the transmission distance is set to 10 m, the symbol rate is set to 12.5 MHz and the frequency of the carrier is set to 36 MHz. As is apparent from FIG. 22, when the delay amount is equal to or lower than about 1.5/16 symbol period (about 9.4% of 1 symbol period) directly in respect of the signal, the S/N ratio is not deteriorated more than in the case where multiple paths are not present and no adverse effect by multiple paths is resulted.

Figure 23:
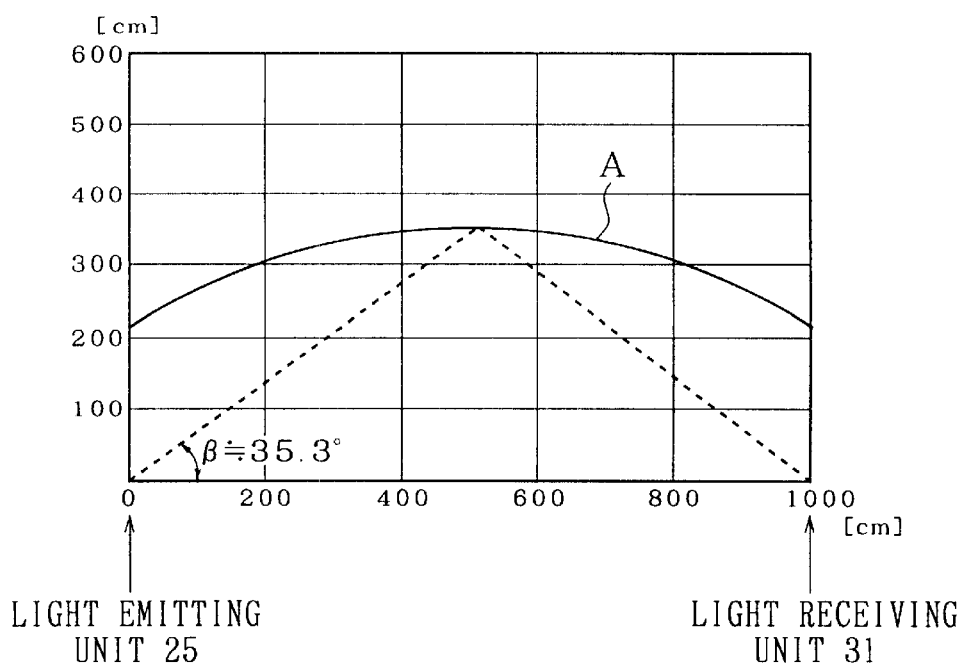
FIG. 23 is a diagram showing a restriction angle.

In the second case, Equation (5) shows a positional relationship in which the S/N ratio becomes equal to an S/N ratio in the case where multiple paths are not present which is indicated by a bold line A of FIG. 23.

$$y=\sqrt{(-0.333611x^2+333.610995x+41753.501145)} \quad (5)$$

The radiation angle of the light emitting unit 25 and the light receiving angle of the light receiving unit 31 are set such that a signal reflected from outside of the position shown by the bold line A can be restricted and, for example, when the radiation angle of the light emitting unit 25 is made equal to the light receiving angle of the light receiving unit 31, adverse influence of multiple paths can be prevented by setting the angles to β≈35.3.

Figure 24:
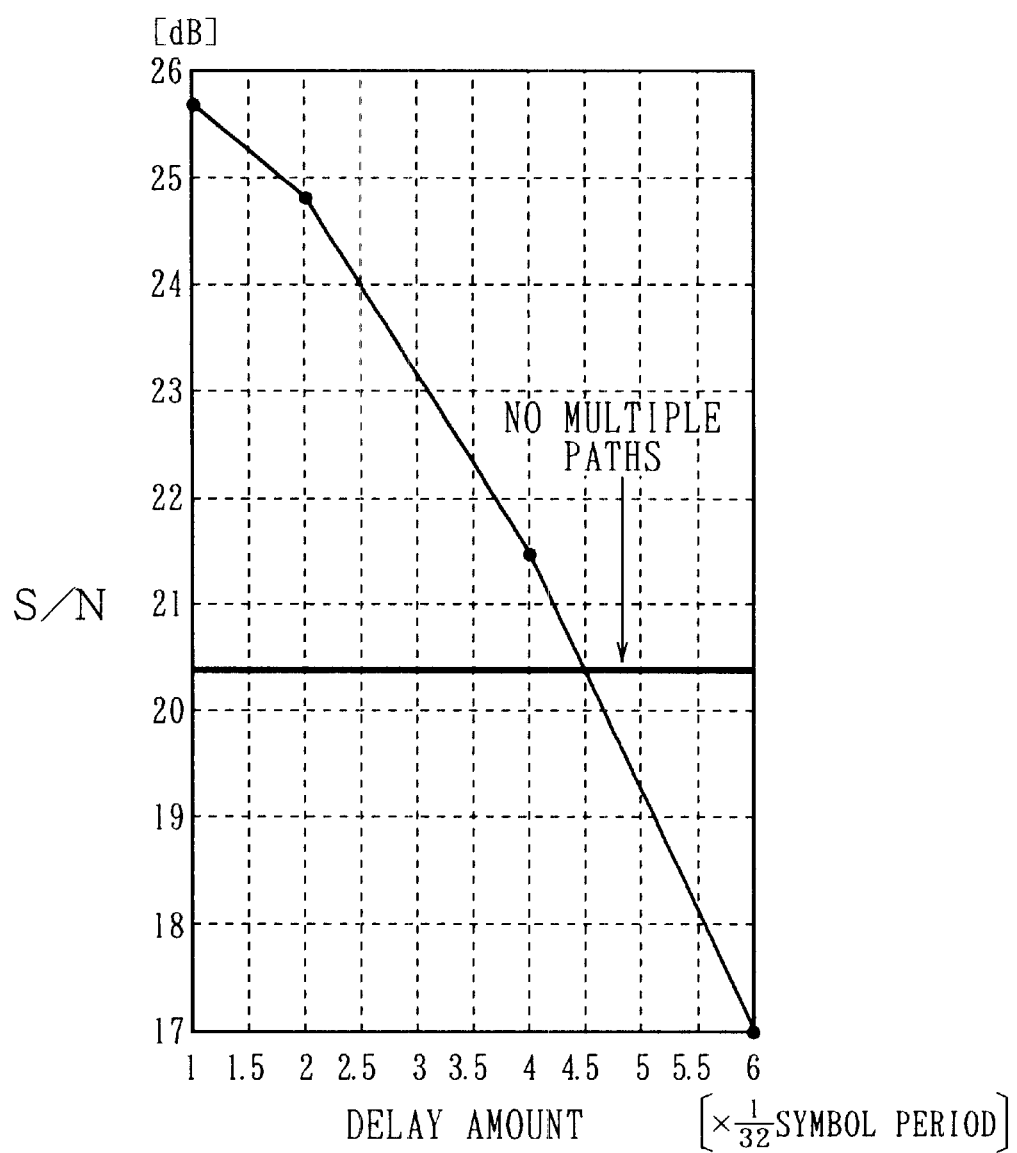
FIG. 24 is a diagram showing a relationship between a delay amount of a reflection signal and an S/N ratio of reception data.

In the third case, with regard to a signal modulated by 16 QAM, FIG. 24 shows a relationship between a delay amount and the S/N ratio of the reception data m1'(t) and m2'(t) when the error rate is set to 10-6 (S/N=20.4 dB) with no ECC, the reflection coefficient is set to 1, the roll-off rate is set to 30%, the transmission distance is set to 10 m, the symbol rate is set to 12.5 MHz and the frequency of the carrier is set to 16 MHz. As is apparent from FIG. 24, the S/N ratio is not deteriorated more than in the case where multiple paths are not present and no adverse influence by multiple paths is resulted when the delay amount is equal to or lower than about 4.5/32 symbol period (14.1% of 1 symbol period) directly in respect of the signal.

Figure 25:
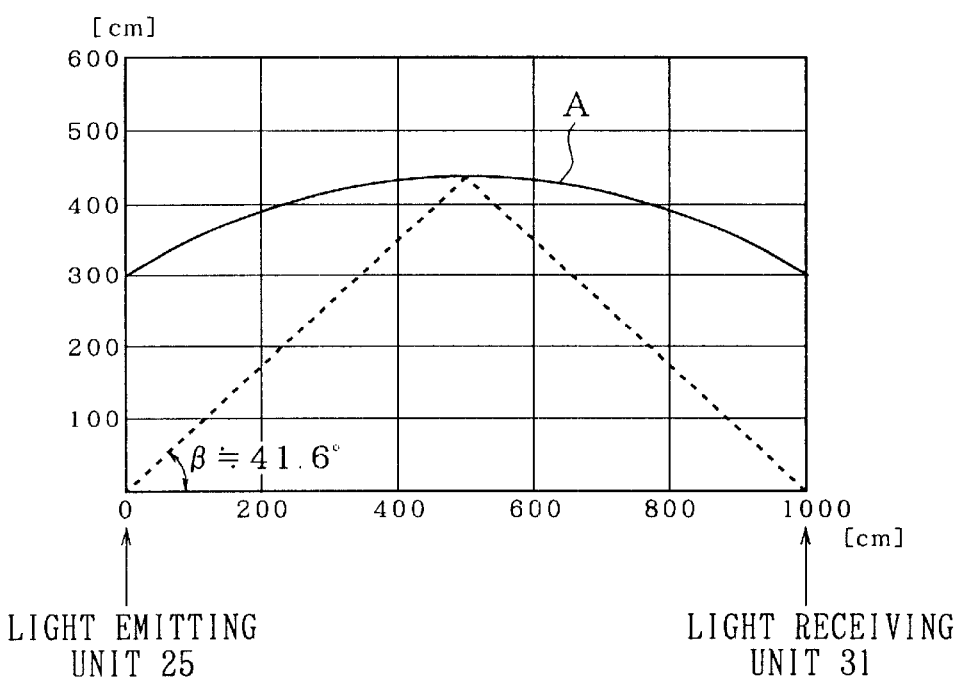
FIG. 25 is a diagram showing a restriction angle.

In the third case, Equation (6) shows a positional relationship in which the S/N ratio is equal to an S/N ratio in the case where multiple paths are not present which is indicated by a bold line A of FIG. 25.

$$y=\sqrt{(-0.440999x^2+440.999214x+86976.759024)} \quad (6)$$

The radiation angle of the light emitting unit 25 and the light receiving angle of the light receiving unit 31 are set such that a signal reflected from outside of the position shown by the bold line A can be restricted and, for example, when the radiation angle of the light emitting unit 25 is made equal to the light receiving angle of the light receiving unit 31, adverse influence of multiple paths can be prevented by setting the angles to $\beta \approx 41.6$.

In the fourth case, with regard to a signal modulated by 16 QAM, FIG. 26 shows a relationship between a delay amount and the S/N ratio of the reception data m1'(t) and m2'(t) when the error rate is set to 10-6 (S/N=20.4 dB) with no ECC, the reflection coefficient is set to 1, the roll-off rate is set to 30%, the transmission distance is set to 10 m, the symbol rate is set to 12.5 MHz and the frequency of the carrier is set to 36 MHz. As is apparent from FIG. 26, when the delay amount is equal to or lower than about 2.7/32 symbol period (about 8.4% of 1 symbol period) directly in respect of the signal, the S/N ratio is not deteriorated more than in the case where the multiple paths are not present and no adverse influence by multiple paths is resulted.

Figure 27:
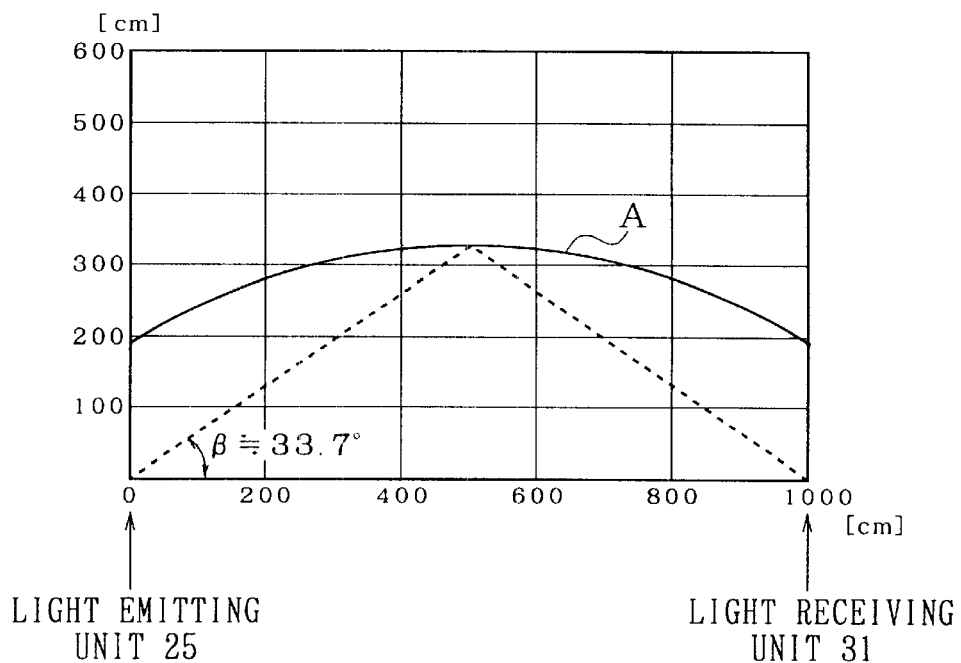
FIG. 27 is a diagram showing a restriction angle.

In the fourth case, Equation (7) shows a positional relationship in which the S/N ratio is equal to an S/N ratio in the case where multiple paths are not present which is indicated by a bold line A of FIG. 27.

$$y=\sqrt{(-0.30844x^2+308.44005 7x+34391.54828)} \quad (7)$$

The radiation angle of the light emitting unit 25 and the light receiving angle of the light receiving unit 31 are set such that a signal reflected from outside of the position shown by the bold line A can be restricted and, for example, when the radiation angle of the light emitting unit 25 is made equal to the light receiving angle of the light receiving unit 31, adverse influence by multiple paths can be prevented by setting the angles to $\beta \approx 33.7$.

Figure 28:
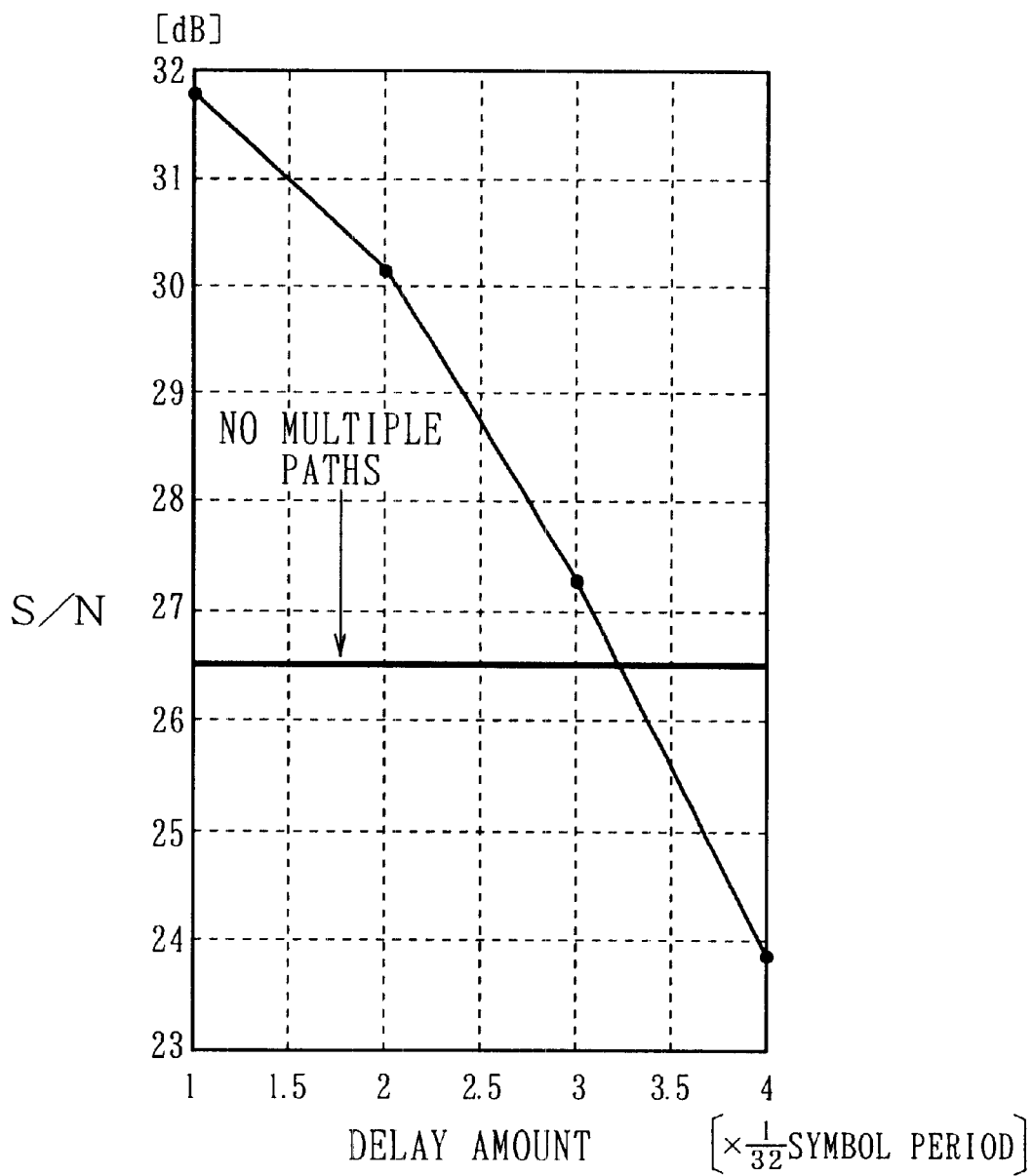
FIG. 28 is a diagram showing a relationship between a delay amount of a reflection signal and an S/N ratio of reception data.

In the fifth case, with regard to a signal modulated by 64 QAM, FIG. 28 shows a relationship between a delay amount and the S/N ratio of the reception data m1'(t) and m2'(t) when the error rate is set to 10-6 (S/N=26.5 dB) with no ECC, the reflection coefficient is set to 1, the roll-off rate is set to 30%, the transmission distance is set to 10 m, the symbol rate is set to 12.5 MHz and the frequency of the carrier is set to 16 MHz. As is apparent from FIG. 28, when the delay amount is about 3.3/32 symbol period (about 10.3% or less of 1 symbol period) directly in respect of the signal, the S/N ratio is not deteriorated more than in the case where the multiple paths are not present and no adverse influence by multiple paths is resulted.

Figure 29:
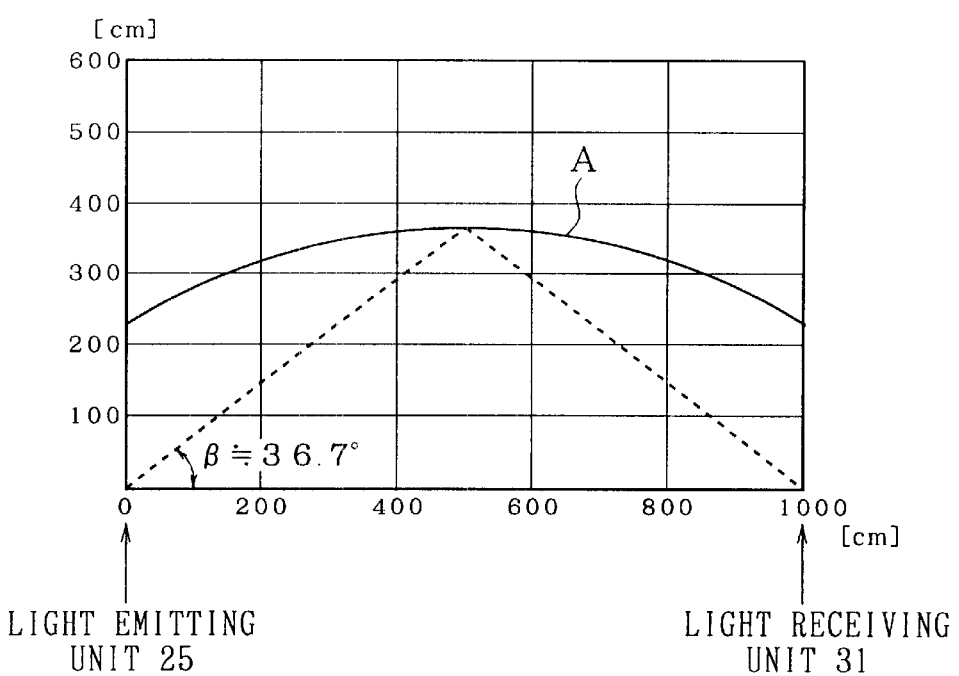
FIG. 29 is a diagram showing a restriction angle.

In the fifth case, Equation (8) shows a positional relationship in which the S/N ratio is equal to an S/N ratio in the case where multiple paths are not present which is indicated by a bold line A of FIG. 29.

$$y=\sqrt{e,rad} \, (-0.357432x^2+357.432299x+49705.987633) \quad (8)$$

When the radiation angle of the light emitting unit 25 and the light receiving angle of the light receiving unit 31 are set such that a signal reflected from outside of the position shown by the bold line A can be restricted, for example, the radiation angle of the light emitting unit 25 is made equal to the light receiving angle of the light receiving unit 31, adverse influence by multiple paths can be prevented by setting the angles to $\beta \approx 36.7$.

Figure 30:
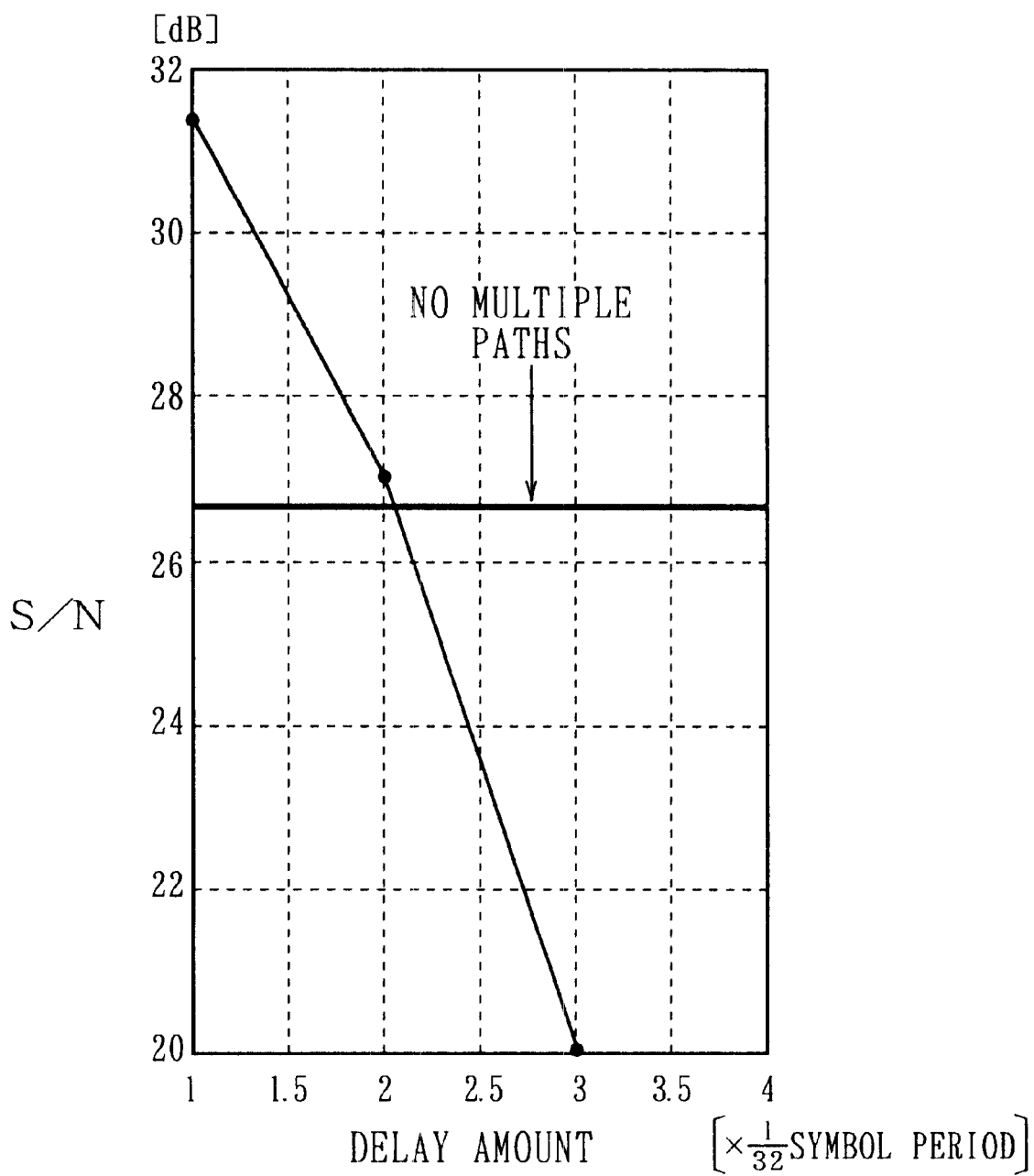
FIG. 30 is a diagram showing a relationship between a delay amount of a reflection signal and an S/N ratio of reception data.

In the sixth case, with regard to a signal modulated by 64 QAM, FIG. 30 shows a relationship between a delay amount and the S/N ratio of the reception data m1'(t) and m2'(t) when the error rate is set to 10-6 (S/N=26.5dB) with no ECC, the reflection coefficient is set to 1, the roll-off rate is set to 30%, the transmission distance is set to 10 m, the symbol rate is set to 12.5 MHz and the frequency of the carrier is set to 36 MHz. As is apparent from FIG. 30, the S/N ratio is not deteriorated more than in the case where the multiple paths are not present and no adverse influence by multiple paths is resulted when the delay amount is equal to or less than about 2.1/32 symbol period (about 6.6% of 1 symbol period) directly in respect of the signal.

Figure 31:
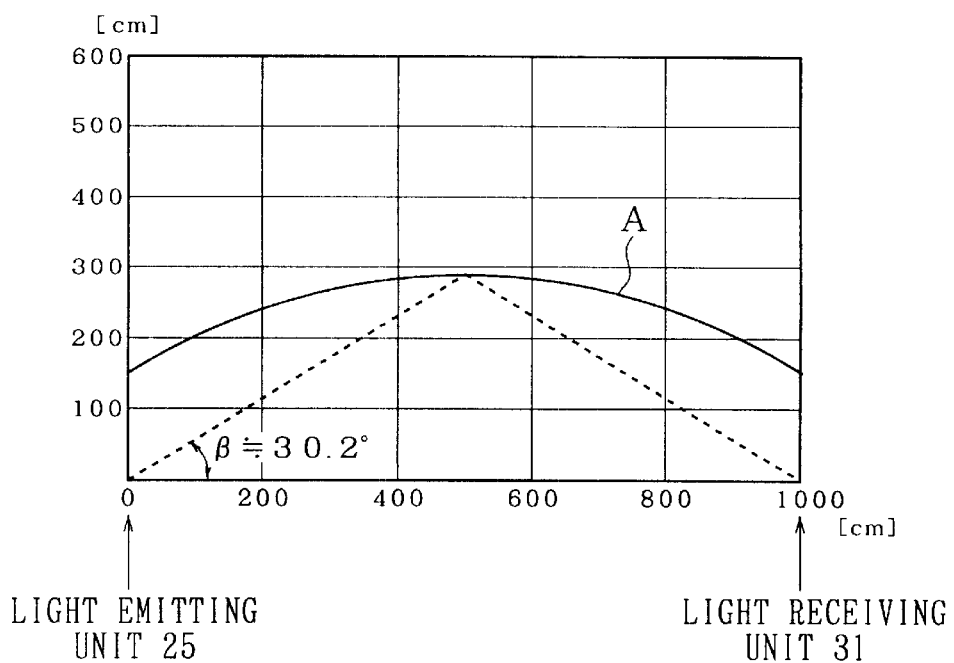
FIG. 31 is a diagram showing a restriction angle.

In the sixth case, Equation (9) shows a positional relationship in which the S/N ratio is equal to an S/N ratio in the case where multiple paths are not present which is indicated by a bold line A of FIG. 31.

$$y=\sqrt{(-0.253623x^2+253.623425x+21545.706243)} \quad (9)$$

When the radiation angle of the light emitting unit 25 and the light receiving angle of the light receiving unit 31 are set such that a signal reflected from outside of the position shown by the bold line A can be restricted, for example, the radiation angle of the light emitting unit 25 is made equal to the light receiving angle of the light receiving unit 31, adverse influence by multiple paths can be prevented by setting the angles to $\beta \approx 30.2$.

Figure 32:
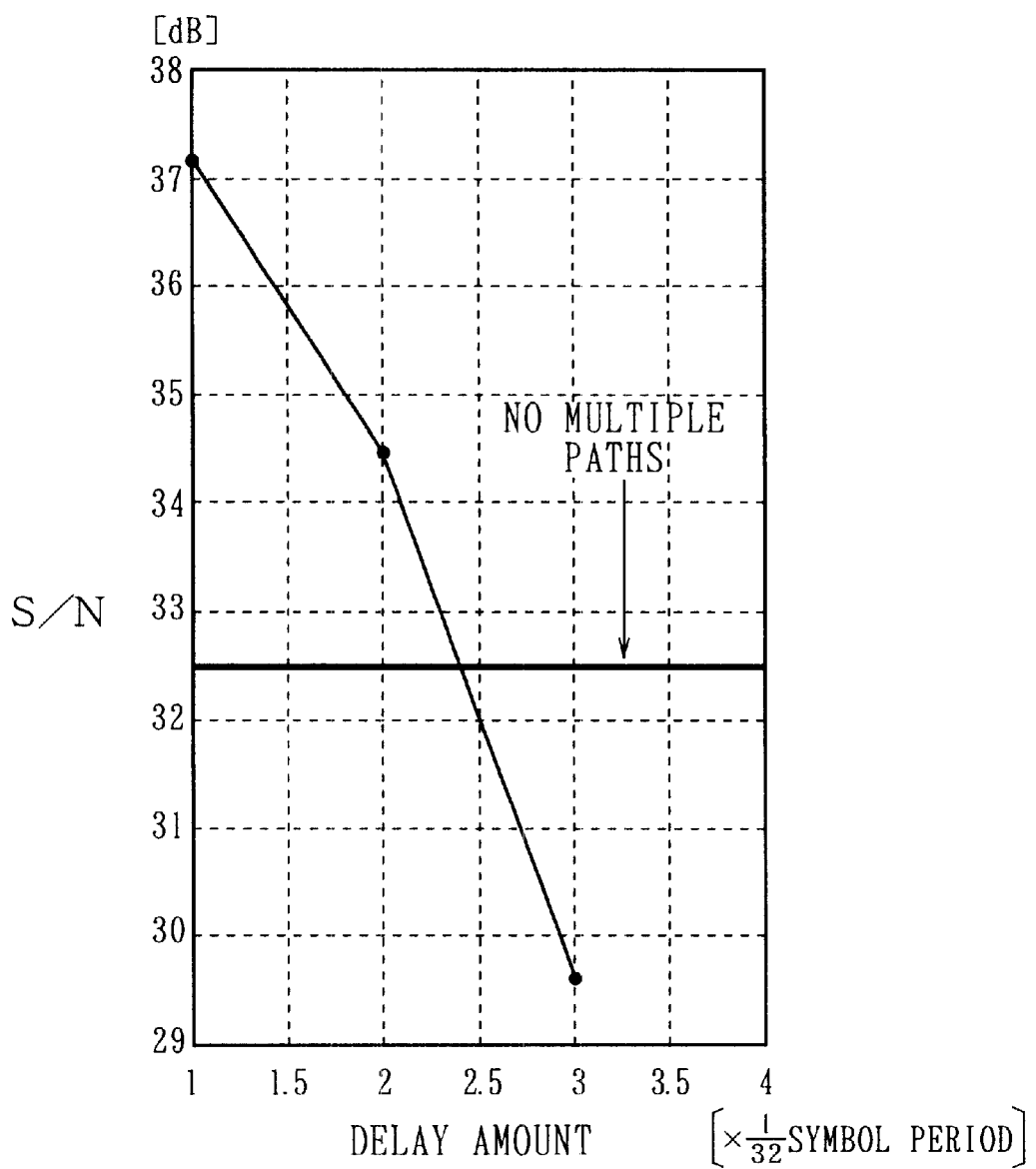
FIG. 32 is a diagram showing a relationship between a delay amount of a reflection signal and an S/N ratio of reception data.

In the seventh case, with regard to a signal modulated by 256 QAM, FIG. 32 shows a relationship between a delay amount and the S/N ratio of the reception data m1'(t) and m2'(t) when the error rate is set to 10-6 (S/N=32.5dB) with no ECC, the reflection coefficient is set to 1, the roll-off rate is set to 30%, the transmission distance is set to 10 m, the symbol rate is set to 12.5 MHz and the frequency of the carrier is set to 16 MHz. As is apparent from FIG. 32, when the delay amount is equal to or less than about 2.4/32 symbol period (about 7.5% of 1 symbol period) directly in respect of the signal, the S/N ratio is not deteriorated more than in the case where the multiple paths are not present and no adverse influence by multiple paths is resulted.

Figure 33:
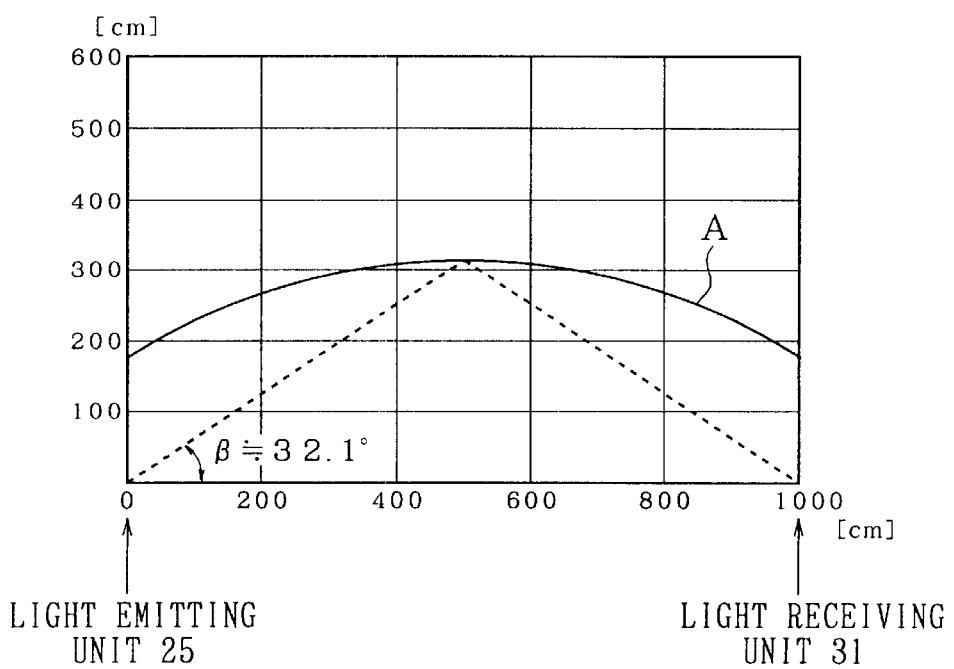
FIG. 33 is a diagram showing a restriction angle.

In the seventh case, Equation (10) shows a positional relationship in which the S/N ratio is equal to an S/N ratio in the case where multiple paths are not present which is indicated by a bold line A of FIG. 33.

$$y=\sqrt{(-0.281816x^2+281.81557x+27646.10744)} \quad (10)$$

When the radiation angle of the light emitting unit 25 and the light receiving angle of the light receiving unit 31 are set such that a signal reflected from outside of the position shown by the bold line A can be restricted, for example, the radiation angle of the light emitting unit 25 is made equal to the light receiving angle of the light receiving unit 31, adverse influence by multiple paths can be prevented by setting the angles to $\beta \approx 32.1$.

Figure 34:
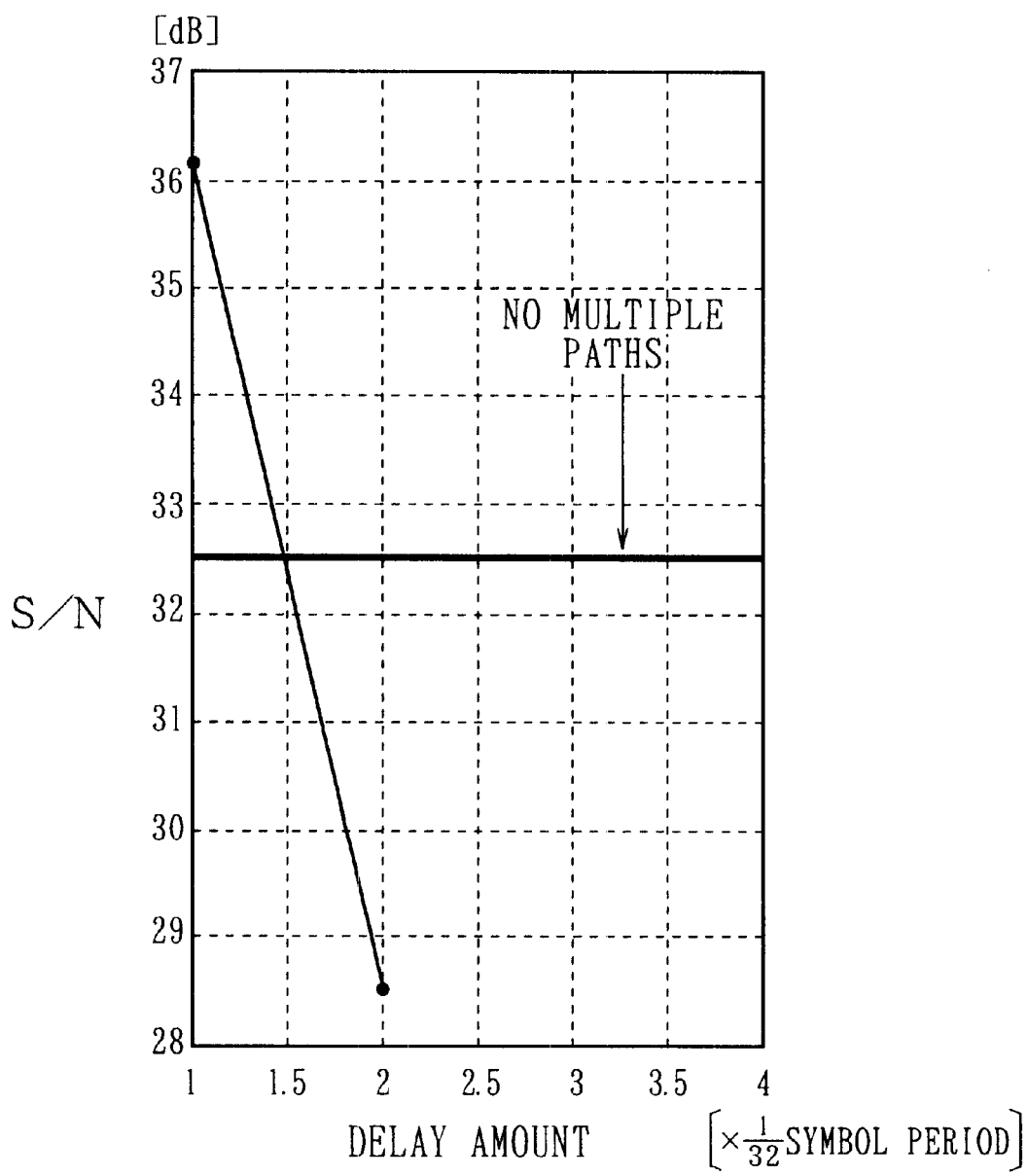
FIG. 34 is a diagram showing a relationship between a delay amount of a reflection signal and an S/N ratio of reception data.

In the eighth case, with regard to a signal modulated by 256 QAM, FIG. 34 shows a relationship between a delay amount and the S/N ratio of the reception data m1'(t) and m2'(t) when the error rate is set to 10-6 (S/N=32.5 dB) with no ECC, the reflection coefficient is set to 1, the roll-off rate is set to 30%, the transmission distance is set to 10 m, the symbol rate is set to 12.5 MHz and the frequency of the carrier is set to 36 MHz. As is apparent from FIG. 34, when the delay amount is equal to or less than about 1.5/32 symbol period (about 4.7% of 1 symbol period) directly in respect of the signal, the S/N ratio is not deteriorated more than in the case where the multiple paths are not present and no adverse influence by multiple paths is resulted.

Figure 35:
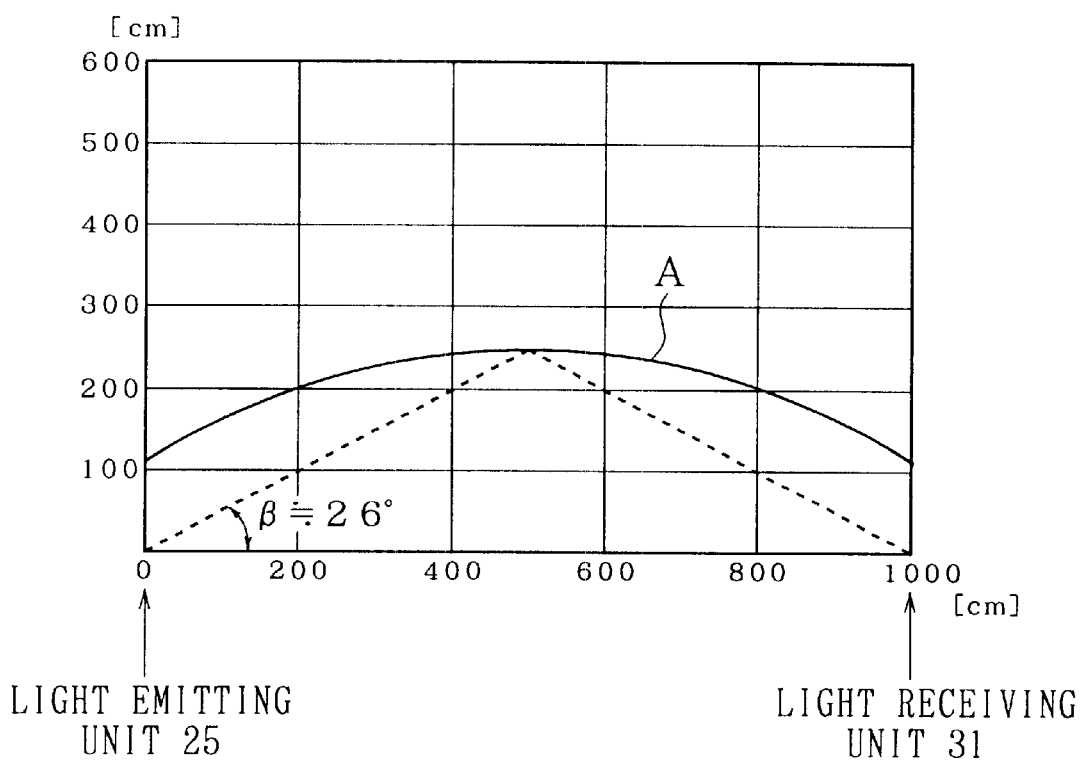
FIG. 35 is a diagram showing a restriction angle.

In the eighth case, Equation (11) shows a positional relationship in which the S/N ratio is equal to an S/N ratio in the case where multiple paths are not present which is shown by a bold line A of FIG. 35.

$$y = \sqrt{(-0.192021x^2 + 192.021209x + 11408.760139)} \quad (11)$$

When the radiation angle of the light emitting unit 25 and the light receiving angle of the light receiving unit 31 are set such that a signal reflected from outside of the position shown by the bold line A can be restricted, for example, the radiation angle of the light emitting unit 25 is made equal to the light receiving angle of the light receiving unit 31, adverse influence by multiple paths can be prevented by setting the angles to β≈26.0.

In this way, according to the above-described embodiment, a delay amount of multiple paths which does not cause adverse influence can be calculated based on modulation system, a ratio of a frequency of carrier to a symbol rate, a bit error rate and so on and accordingly, by restricting multiple paths having a delay amount larger than the calculated delay amount by adjusting a radiation angle or a light receiving angle of an optical signal by the optical signal restricting unit, adverse influence of multiple paths can be avoided and transmission of transmission data can be carried out at high speed.

According to the embodiment, the delay amount of multiple paths which does not cause adverse influence is calculated based on the relation system, the ratio of the frequency of the carrier to the symbol rate, the bit error rate and so on and an optical signal having a delay amount larger than the calculated delay amount is restricted by the optical signal restricting means. Therefore, adverse influence by multiple paths can precisely and simply be avoided and transmission of data can be carried out at high speed and excellently.

Further, an optical signal having a large delay amount can easily be restricted by a light blocking tube or an optical lens and accordingly, the constitution of an optical transmission apparatus can be simplified. Further, the inner face side of the light blocking tube is provided with a material absorbing light and accordingly, an optical signal can be prevented from being reflected in the light blocking tube and the optical signal having the large delay amount can firmly be restricted.

What we claim is:

1. An optical communication method for communicating a quadrature modulated signal having a carrier signal frequency and a symbol rate, comprising the steps of:

converting the quadrature modulated signal to an optical signal;

transmitting said optical signal with a radiation angle over a communication path which exhibits multi-path delay so as to provide delayed and undelayed optical signals;

receiving the delayed and undelayed optical signals;

demodulating the received optical signals to produce a demodulated digital signal having a bit error rate; and restricting the amount of delay in the delayed optical signal as a function of K, where K is the ratio of the carrier frequency to the symbol rate, so as to limit the bit error rate in the demodulated signal to a predetermined bit error rate.

2. The method of claim 1 wherein the amount of delay in the delayed optical signal is restricted by limiting the radiation angle of the transmitted optical signal.

3. The method of claim 1 wherein the amount of delay in the delayed optical signal is restricted by limiting the radiation angle of the received optical signals.

4. An optical communication system comprising:

a transmitter including a quadrature modulator to produce a modulation signal having a carrier signal frequency and a symbol rate, and means for converting the modulation signal to an optical signal and for transmitting said optical signal over a communication path which exhibits multi-path delay so as to provide delayed and undelayed optical signals;

a receiver for receiving the delayed and undelayed optical signals and including a quadrature demodulator for demodulating the received optical signals to produce a digital signal with a bit error rate; and restricting means for restricting the amount of delay in the delayed optical signal as a function of K, where K is the ratio of the carrier frequency to the symbol rate, such that the bit error rate of said digital signal is less than a predetermined bit error rate.

5. The system of claim 4 wherein said restricting means comprises a light blocking tube through which said optical signal is emitted.

6. The system of claim 5 wherein said light blocking tube includes an inner surface provided with a light absorbing member.

7. The system of claim 4 wherein said optical signal is transmitted with a radiation angle, and said restricting means comprises an optical lens to limit said radiation angle to a predetermined amount.

8. The system of claim 4 wherein the quadrature modulator is a quadrature phase modulator, K≦1.28, and the amount of restricted delay is not greater than about 18.1% of the symbol period.

9. The system of claim 4 wherein the quadrature modulator is a quadrature phase modulator, 1.28<K≦2.88, and the amount of restricted delay is not greater than about 9.4% of the symbol period.

10. The system of claim 4 wherein the quadrature modulator is a 16 QAM modulator, K≦2.28 and the amount of restricted delay is not greater than about 14.1% of the symbol period.

11. The system of claim 4 wherein the quadrature modulator is a 16 QAM modulator, 1.28<K≦2.88, and the amount of restricted delay is not greater than about 8.4% of the symbol period.

12. The system of claim 4 wherein the quadrature modulator is a 64 QAM modulator, K≦28, and the amount of restricted delay is not greater than about 10.3% of the symbol period.

13. The system of claim 4 wherein the quadrature modulator is a 64 QAM modulator, 1.28<K≦2.88, and the amount of restricted delay is not greater than about 6.6% of the symbol period.

14. The system of claim 4 wherein the quadrature modulator is a 256 QAM modulator, K≦28, and the amount of restricted delay is not greater than about 7.5% of the symbol period.

15. The system of claim 4 wherein the quadrature modulator is a 256 QAM modulator, 1.28<K≦2.88, and the amount of restricted delay is not greater than about 4.7% of the symbol period.

* * * * *